US009919520B2

(12) United States Patent
Nagase et al.

(10) Patent No.: US 9,919,520 B2
(45) Date of Patent: Mar. 20, 2018

(54) INK JET RECORDING METHOD

(71) Applicant: Seiko Epson Coporation, Tokyo (JP)

(72) Inventors: Makoto Nagase, Shiojiri (JP); Akihito Sao, Matsumoto (JP); Kenichiro Kubota, Matsumoto (JP); Jun Ito, Shimosuwa-machi (JP); Naoki Koike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/624,759

(22) Filed: Feb. 18, 2015

(65) Prior Publication Data

US 2015/0231880 A1 Aug. 20, 2015

(30) Foreign Application Priority Data

Feb. 18, 2014 (JP) ................................ 2014-028250
Mar. 20, 2014 (JP) ................................ 2014-057931

(51) Int. Cl.
*C09D 11/02* (2014.01)
*B41J 2/14* (2006.01)

(52) U.S. Cl.
CPC ...................................... *B41J 2/14* (2013.01)

(58) Field of Classification Search
USPC .......... 106/22 E, 31.86; 347/60, 20; 510/108
See application file for complete search history.

(56) References Cited

U.S. PATENT DOCUMENTS 5,492,559 A * 2/1996 Oliver .................... C09D 11/34 106/31.25
6,796,633 B1 * 9/2004 Kawamata ........... B41J 2/16523 347/23
2007/0285467 A1 * 12/2007 Tanaka ................ B41J 2/04528 347/60
2008/0006175 A1 * 1/2008 King ...................... C09D 11/36 106/31.6

(Continued)

FOREIGN PATENT DOCUMENTS

JP 10-095132 A 4/1998
JP 2002-225301 A 8/2002

(Continued)

*Primary Examiner* — Lam Nguyen
(74) *Attorney, Agent, or Firm* — Nutter McClennen & Fish LLP; John J. Penny, Jr.

(57) ABSTRACT

An ink jet recording method according to the invention includes: ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image. In the preliminary ejecting of the droplets, a time interval at which the preliminary ejecting is performed by a predetermined nozzle is equal to or greater than two seconds and equal to or less than twenty five seconds. The organic solvent contains a first solvent which is at least one kind selected from a hydrocarbon-based solvent, an alcohol-based solvent, and an ester-based solvent. Content of the first solvent is equal to or greater than 40% by mass with respect to entire content of the non-water-based ink.

25 Claims, 3 Drawing Sheets

(56) References Cited

U.S. PATENT DOCUMENTS

| | | | | |
|---|---|---|---|---|
| 2008/0045427 | A1* | 2/2008 | Hijikata | B41J 2/1707 510/108 |
| 2009/0235843 | A1 | 9/2009 | Sugita et al. | |
| 2011/0074897 | A1* | 3/2011 | Araki | C09D 11/101 347/102 |
| 2011/0315049 | A1 | 12/2011 | Aoki et al. | |
| 2012/0026225 | A1 | 2/2012 | Mataki | |
| 2012/0252948 | A1 | 10/2012 | King et al. | |
| 2012/0255460 | A1* | 10/2012 | Kawakami | C09D 11/36 106/31.49 |
| 2013/0120492 | A1 | 5/2013 | Kubota et al. | |

FOREIGN PATENT DOCUMENTS

| | | | |
|---|---|---|---|
| JP | 2005-330298 | A | 12/2005 |
| JP | 2008-230144 | A | 10/2008 |
| JP | 2009-241277 | A | 10/2009 |
| JP | 2010-018730 | A | 1/2010 |
| JP | 2011-218724 | A | 11/2011 |
| JP | 2012-012432 | A | 1/2012 |
| JP | 2012-046671 | A | 3/2012 |
| JP | 2012-046680 | A | 3/2012 |
| JP | 2012-214674 | A | 11/2012 |
| JP | 2012-219202 | A | 11/2012 |
| JP | 2013-104009 | A | 5/2013 |
| JP | 2013-177597 | A | 9/2013 |
| JP | 2014-000692 | A | 1/2014 |

* cited by examiner

INK JET RECORDING METHOD

BACKGROUND

1. Technical Field

The present invention relates to an ink jet recording method.

2. Related Art

In the related art, an ink jet recording apparatus which ejects minute ink droplets from nozzles of a recording head and causes the ink droplets to adhere to a recording medium to record images and characters is known. As an ink composition used for such recording, a water-based (aqueous) ink composition obtained by dispersing or dissolving pigment, resin, or the like in water is known. Furthermore, a non-water-based (oil-based) ink composition obtained by dispersing or dissolving pigment, resin, or the like in an organic solvent without water has been developed.

Among such ink compositions for ink jet recording, the non-water-based ink composition is suitably used since it is possible to form images with satisfactory fixability and abrasion resistance on a film of vinyl chloride or the like and to suppress occurrence of curl and the like of papers such as an ordinary paper.

For example, JP-A-2012-12432 discloses usage of an oil-based ink jet ink, which contains a solvent such as a hydrocarbon-based solvent, diester, or higher alcohol, to perform printing on an ordinary paper such as a PPC sheet, and there is a description that by using the oil-based ink jet ink, it is possible to enhance permeability of the ink and to suppress contamination of a printed object which occurs during roller transfer. In addition, JP-A-2012-46671 discloses a non-water-based or water-based ink jet ink which contains an amide-based solvent, and there is a description that by using the ink jet ink, it is possible to obtain an image with a satisfactory drying property. Moreover, JP-A-2010-18730 discloses usage of a solvent-based ink jet ink composition, which contains three types of alcohol-based solvents with different boiling points, to perform printing on a non-absorbable material, and there is a description that by using the ink composition, it is possible to obtain an image with satisfactory drying property.

However, although it is possible to enhance the drying property of the obtained image by using the aforementioned solvents disclosed in JP-A-2012-12432 and JP-A-2010-18730, a meniscus portion of each nozzle in a recording head is easily affected by dryness, which brings about deterioration in recording stability. In addition, the solvent disclosed in JP-A-2012-46671 degrades the drying property of the image due to high moisture absorbency over time. As described above, enhancement of a drying property of a recorded image and maintenance of excellent recording stability, due to which nozzle clogging and the like can be suppressed, are in a trade-off relationship, and it is difficult to satisfy both the performances in high levels.

Here, it is possible to reduce occurrence of ejection failures of a nozzle, which ejects ink for forming an image, from among nozzles in a recording head to some extent since the nozzle continuously ejects the ink. In contrast, a nozzle which does not eject ink for forming an image particularly tends to cause an ejection failure with an increase in viscosity of the ink which adheres to the nozzle.

Incidentally, there is a case where abrasion resistance of a recorded image deteriorates depending on a type of a solvent contained on a non-water-based ink or a type of a recording medium used.

SUMMARY

An advantage of some aspects of the invention is to provide an ink jet recording method, which can achieve excellent recording stability, and by which it is possible to record a image with an excellent drying property and abrasion resistance.

The first invention can be implemented in the following configurations or application examples.

Application Example 1

According to an aspect of the invention, there is provided an ink jet recording method including: ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image. In the preliminary ejecting of the droplets, a time interval at which the preliminary ejecting is performed by a predetermined nozzle is equal to or greater than two seconds and equal to or less than twenty five seconds. The organic solvent contains a first solvent which is at least one kind selected from a hydrocarbon-based solvent, an alcohol-based solvent, and an ester-based solvent. Content of the first solvent is equal to or greater than 40% by mass with respect to entire content of the non-water-based ink.

Application Example 2

It is preferable in Application Example 1 that equal to or greater than 50% by mass of total mass of the first solvent be a solvent with a standard boiling point of equal to or less than 185° C.

Application Example 3

It is preferable in Application Example 1 or 2 that the resin contain at least one of vinyl chloride-based resin and (meth)acrylic-based resin.

Application Example 4

It is preferable in any one of Application Examples 1 to 3 that content of the resin be equal to or greater than 0.5% by mass and equal to or less than 10% by mass with respect to total mass of the non-water-based ink.

Application Example 5

It is preferable in any one of Application Examples 1 to 4 that the ejecting of the droplets to form an image be performed by a plurality of scanning operations, in each of which the non-water-based ink is ejected while a position of the recording head relative to the recording medium is changed.

Application Example 6

It is preferable in Application Example 5 that in the preliminary ejecting of the droplets, the preliminary ejecting be performed between the scanning operations, and that the droplets of the non-water-based ink be ejected onto another object than the recording medium.

Application Example 7

It is preferable in any one of Application Examples 1 to 4 that the ejecting of the droplets to form an image be performed by a single scanning operation in which the non-water-based ink is ejected while a position of the recording head relative to the recording medium is changed.

Application Example 8

It is preferable in Application Example 7 that in the preliminary ejecting of the droplets, the droplets of the non-water-based ink be made to adhere to a position outside a region, in which the image is to be formed, on the recording medium.

Application Example 9

It is preferable in any one of Application Examples 1 to 8 that the recording medium be a low-ink-absorbent recording medium.

Application Example 10

It is preferable in any one of Application Examples 1 to 9 that in the ejecting of the droplets to form an image, a surface temperature of the recording medium be equal to or less than 60° C.

The second invention can be implemented in the following configurations or application examples.

Application Example 1

According to another aspect of the invention, there is provided an ink jet recording method including: ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image. In the preliminary ejecting of the droplets, a time interval at which the preliminary ejecting is performed by a predetermined nozzle is equal to or greater than two seconds and equal to or less than twenty five seconds. The organic solvent contains glycol ethers with a standard boiling point of equal to or less than 185° C. Content of glycol ethers with the standard boiling point of equal to or less than 185° C. is equal to or greater than 35% by mass with respect to total mass of the non-water-based ink.

Application Example 2

It is preferable in Application Example 1 that the resin contain at least one of vinyl chloride-based resin and (meth) acrylic-based resin.

Application Example 3

It is preferable in Application Example 1 or 2 that the resin contain vinyl chloride-based resin.

Application Example 4

It is preferable in any one of Application Examples 1 to 3 that content of the resin be equal to or greater than 0.5% by mass and equal to or less than 10% by mass with respect to total mass of the non-water-based ink.

Application Example 5

It is preferable in any one Application Examples 1 to 4 to further include, in the ejecting of the droplets to form an image, heating the recording medium.

Application Example 6

It is preferable in Application Example 5 that in the heating of the recording medium, a surface temperature of the recording medium be heated to a temperature of equal to or greater than 35° C.

Application Example 7

It is preferable in any one of Application Examples 1 to 6 that the content of glycol ethers with the standard boiling point of equal to or less than 185° C. be equal to or greater than 50% by mass with respect to the total mass of the non-water-based ink.

Application Example 8

It is preferable in any one of Application Examples 1 to 7 that the non-water-based ink further contain a lactone-based solvent.

Application Example 9

It is preferable in any one of Application Examples 1 to 8 that the ejecting of the droplets to form an image is performed by a plurality of scanning operations, in each of which the non-water-based ink is ejected while a position of the recording head relative to the recording medium is changed.

Application Example 10

It is preferable in Application Example 9 that in the preliminary ejecting of the droplets, the preliminary ejecting be performed between the scanning operations, and the droplets of the non-water-based ink is ejected onto another object than the recording medium.

Application Example 11

It is preferable in any one of Application Examples 1 to 8 that the ejecting of the droplets to form an image be performed by a single scanning operation in which the non-water-based ink is ejected while a position of the recording head relative to the recording medium is changed.

Application Example 12

It is preferable in Application Example 11 that in the preliminary ejecting of the droplets, the droplets of the non-water-based ink be made to adhere to a position outside a region, in which the image is to be formed, on the recording medium.

Application Example 13

It is preferable in any one of Application Examples 1 to 12 that the recording medium be a low-ink-absorbent recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
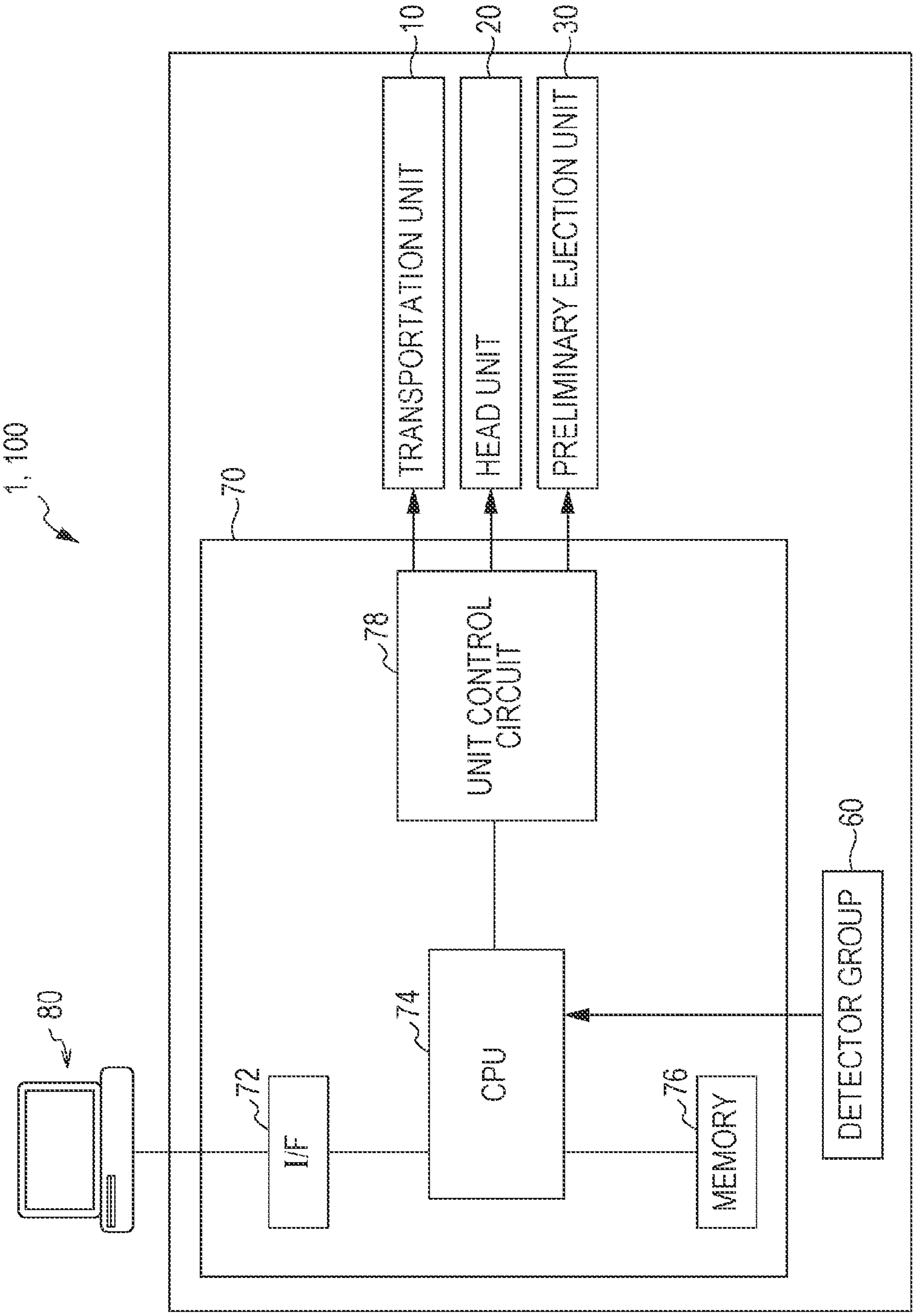
FIG. 1 is a block diagram showing a configuration of an ink jet recording apparatus capable of being used for an ink jet recording method according to an embodiment of the invention.

Hereinafter, a description will be given of some embodiments of the first invention. The embodiments described below are for illustrating an example of the invention. The invention is not limited to the following embodiments, and various modifications implemented without departing from the gist of the invention are also included. In addition, all the configurations described below are not necessarily essential configurations of the invention.

In the invention, an "image" represents a pattern formed by a group of dots, and examples of the image include a character pattern, a drawing or design pattern, and a solid color pattern.

In the invention, "non-water-based ink" represents ink which contains an organic solvent as a main solvent and does not contain water as a main solvent. The "non-water-based ink" preferably represents ink with water content of equal to or less than 3% by mass, more preferably represents ink with water content of equal to or less than 1% by mass, more preferably represents ink water content of less than 0.05% by mass, further preferably represents ink with water content of less than 0.01% by mass, further preferably represents ink with water content of less than 0.005% by mass, and the most preferably represents ink with water content of less than 0.001% by mass. Alternatively, ink which contains substantially no water may be used. The expression "which contains substantially no water" represents that the water is intentionally not contained in the ink.

1. Ink Jet Recording Method

According to an embodiment, there is provided an ink jet recording method including: ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image. In the preliminary ejecting of the droplets, a time interval at which the preliminary ejecting is performed by a predetermined nozzle is equal to or greater than two seconds and equal to or less than twenty five seconds. The organic solvent contains a first solvent which is at least one kind selected from a hydrocarbon-based solvent, an alcohol-based solvent, and an ester-based solvent. Content of the first solvent is equal to or greater than 40% by mass with respect to entire content of the non-water-based ink.

Hereinafter, a description will be given of non-water-based ink and a recording method, which are used in the ink jet recording method according to the embodiment, in this order.

1.1 Non-Water-Based Ink

The non-water-based ink which is used in the ink jet recording method according to the embodiment contains an organic solvent, a color material, and resin. Hereinafter, a detailed description will be given of constituents which are or may be contained in the non-water-based ink according to the embodiment.

1.1.1 Organic Solvent

The organic solvent contains a first solvent which is at least one kind selected from a hydrocarbon-based solvent, an alcohol-based solvent, and an ester-based solvent. Since the first solvent has an excellent drying property, it is possible to enhance a drying property of a recorded image.

Examples of the hydrocarbon-based solvent include aliphatic hydrocarbon (such as paraffin and isoparaffin), alicyclic hydrocarbon (such as cyclohexane, cyclooctane, and cyclodecane), and aromatic hydrocarbon (such as benzene, toluene, xylene, naphthalene, and tetralin). As such a hydrocarbon-based solvent, a commercially available product may be used. Examples thereof include aliphatic hydrocarbon-based solvents and alicyclic hydrocarbon-based solvents such as IP Solvent 1016, IP Solvent 1620, and IP Clean LX (all of which are names of products manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (all of which are names of products manufactured by Exxon Mobil Corporation), NS Clean 100, NS Clean 110, NS Clean 200, and NS Clean 220 (all of which are names of products manufactured by JX Nippon Oil & Energy Corporation), and Naphtesol 160, Naphtesol 200, and Naphtesol 220 (all of which are names of products manufactured by JX Nippon Oil & Energy Corporation) and aromatic hydrocarbon-based solvents such as Solvesso 200 (which is a name of product manufactured by Exxon Mobil Corporation).

Examples of the alcohol-based solvent include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2pentanol, allyl alcohol, 1-hexanol, 1-heptanol, 2-heptanol, and 3-heptanol.

Examples of the ester-based solvent include methyl acetate, ethyl acetate, n-propyl acetate, isopropyl acetate, n-butyl acetate, isobutyl acetate, isopentyl acetate, secondary butyl acetate, amyl acetate, methoxybutyl acetate, methyl lactate, ethyl lactate, butyl lactate, metyl caprylate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate.

It is necessary that the content of the first solvent be equal to or greater than 40% by mass with respect to the total mass (100% by mass) of the non-water-based ink, and the content of the first solvent is preferably equal to or greater than 40% by mass and equal to or less than 85% by mass, and more preferably equal to or greater than 40% by mass and equal to or less than 75% by mass. By setting the content of the first solvent to be equal to or greater than 40% by mass, the drying property of the recorded image is enhanced. In addition, by setting the content of the first solvent to be equal to or less than 85% by mass, more satisfactory recording stability is achieved. In contrast, if the content of the first solvent is less than 40% by mass, the drying property of the recorded image becomes insufficient, which causes a decrease in recording speed, variations in printed images, and the like in some cases.

On the assumption that the total mass of the first solvent contained in the non-water-based ink is 100% by mass, equal to or greater than 50% by mass thereof (more preferably, equal to or greater than 50% by mass and equal to or less than 95% by mass) is preferably a solvent with a boiling point of equal to or less than 185° C. (more preferably, equal to or greater than 145° C. and equal to or less than 185° C.). With such a composition, it is possible to further enhance the drying property of the recorded image and to reduce occurrence of variations in printed images.

As the organic solvent, another solvent than the first solvent may be contained. Examples of such a solvent other than the first solvent include lactone and glycol ethers.

Lactone can dissolve a part of a recording surface (preferably a recording surface which contains vinyl chloride-based resin), impregnate the inside of the recording medium with the non-water-based ink, and thereby enhance adhesion of the non-water-based ink with respect to the recording medium. In the invention, "lactone" collectively refers to cyclic compounds, each of which has an ester group (—CO—O—) in the ring. Although lactone is not particularly limited as long as the compound is included in the aforementioned definition, lactone with two to nine carbon atoms is preferably used. Specific examples of such lactone include α-ethyllactone, α-acetolactone, β-propiolactone, γ-butyrolactone, δ-valerolactone, ϵ-caprolactone, ζ-enantiolactone, η-caprylolactone, γ-valerolactone, γ-heptalactone, γ-nonalactone, β-methyl-δ-valerolactone, 2-butyl-2-ethylpropiolactone, and α,α-diethylpropiolactone, and among these examples, γ-butyrolactone is particularly preferably used. One of the above examples of lactone may be used alone, or two or more kinds may be mixed and used.

In the case where lactone is contained, the content thereof is preferably equal to or greater than 5% by mass and equal to or less than 20% by mass, and more preferably equal to or greater than 10% by mass and equal to or less than 15% by mass with respect to the total mass of the non-water-based ink. If the content of lactone is equal to or greater than 5% by mass, abrasion resistance of the image tends to be further enhanced. If the content thereof is equal to or less than 20% by mass, glossines of the image tends to be enhanced.

Glycol ethers can control wettability of the non-water-based ink with respect to the recording medium and a permeation speed. Examples of glycol ethers include alkylene glycol monoether and alkylene glycol diether. One kind of glycol ethers may be used alone, or two or more kinds may be mixed and used.

Examples of alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Examples of alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

In the case where glycol ethers are contained, the content thereof is preferably equal to or greater than 5% by mass and equal to or less than 30% by mass, and more preferably equal to or greater than 10% by mass and equal to or less than 25% by mass with respect to the total mass of the non-water-based ink. If the content of glycol ethers is equal to or greater than 5% by mass, glossiness and a dot size of the image tend to become satisfactory. If the content thereof is equal to or less than 30% by mass, it tends to be possible to reduce occurrence of variations in printed images.

1.1.2 Color Material

As a color material, dye may be used, or pigment such as inorganic pigment or organic pigment may be used. However, it is preferable to use pigment in terms of light resistance and the like. One kind of such color materials may be used alone, or two or more kinds may be mixed and used.

Examples of the organic pigment include azo pigment (such as azo-lake, insoluble azo pigment, condensed azo pigment, and chelate azo pigment), polycyclic pigment (such as phthalocyanine pigment, perylene and perylene pigment, anthraquinone pigment, quinacridone pigment, dioxazin pigment, thioindigo pigment, isoindolinone pigment, and wuinophthalone pigment), dye-lake (such as basic dye-type lake and acid dye-type lake), nitro pigment, nitroso pigment, aniline black, and daylight fluorescent pigment. In addition, examples of the inorganic pigment include carbon black, titanium dioxide, silica, and alumina.

The content of the color material can be appropriately set as desired and is not particularly limited. However, the content thereof is typically equal to or greater than 0.1% by mass and equal to or less than 10% by mass with respect to the total mass of the non-water-based ink.

In the case where pigment is used as the color material, a pigment dispersant may be contained. Examples thereof include polyester-based polymer compounds such as Hinoact KF1-M, T-6000, T-7000, T-8000, T-8350P, and T-8000E (all of which are manufactured by Takefu Fine Chemicals Co., Ltd.), Solsperse 20000, 24000, 32000, 32500, 33500, 34000, 35200, and 37500 (all of which are manufactured by The Lubrizol Corporation), Disperbyk-161, 162, 163, 164, 166, 180, 190, 191, 192, 2091, and 2095 (all of which are manufactured by BYK Japan KK.), Floren DOPA-17, 22, 33, and G-700 (all of which are manufactured by Kyoeisha Cheimcal Co., Ltd.), Ajisper PB821 and PB711 (all of which are manufactured by Ajinomoto Co., Inc.), and LP4010, LP4050, LP4055, POLYMER 400, 401, 402, 403, 450, 451, and 453 (all of which are manufactured by EFKA Chemicals BV). In the case where the pigment dispersant is used, the content thereof can be appropriately set in accordance with the contained pigment. However, the content of the pigment dispersant is preferably equal to or greater than 5 parts by mass and equal to or less than 200 parts by mass, and more preferably equal to or greater than 30 parts by mass and equal to or less than 120 parts by mass with respect to 100 parts by mass of the pigment contained in the non-water-based ink.

1.1.3 Resin

The non-water-based ink used in the embodiment contains resin. Examples of the resin include resin for forming a coating film to protect an image obtained by the non-water-based ink, resin for enhancing adhesion of an ink coating film of the image, resin for adjusting glossiness of the ink coating film of the image, and resin for enhancing quality of the ink coating film of the image. Among the examples, resin which has at least a function of forming a coating film to protect the image obtained by the non-water-based ink is preferable in terms of friction toughness and the like of a recorded object and the embodiment of the invention is particularly useful. The resin is referred to as fixation resin in some cases.

Examples of the resin include (meth)acrylic resin (such as poly (meth)acrylic acid, polymethyl (meth)acrylate, polyethyl (meth)acrylate, (meth)acrylic acid-(meth)ester acrylate copolymer resin, styrene-(meth)acryl copolymer resin, ethylene-(meth)acrylic acid copolymer resin, ethylene alkyl (meth)acrylate resin, and ethylene-ester (meth)acrylate copolymer resin), vinyl chloride-based resin (such as polyvinyl chloride and vinyl chloride-vinyl acetate-based copolymer resin), aliphatic polyester, aromatic polyester, polyurethane, epoxy resin, polyvinyl acetate, ethylene-vinyl acetate copolymer resin, polycarbonate, polyvinyl butyral, polyvinyl alcohol, phenoxy resin, ethylcellulose resin, cellulose acetate propionate resin, cellulose acetate butyrate, nitrocellulose resin, polystyrene, vinyl toluene-α-methylstyrene copolymer resin, polyamide, polyimide, polysulfone-based resin, petroleum resin, chlorinated polypropylene, polyolefin, terpene-based resin, rhodine-modified phenol resin, various kinds of synthetic rubber such as NBR, SBR, and MBR, and modified compounds thereof. One kind of such resin may be used alone, or two or more kinds may be mixed and used.

Among the above examples of resin, it is preferable to use at least one of (meth)acrylic resin and vinyl chloride-based resin in terms of a further improvement in abrasion resistance of the image. The (meth)acrylic resin contains at least any one of (meth)acrylate and (meth)acrylic acid as a monomer component used during synthesis of the resin. The vinyl chloride-based resin contains at least vinyl chloride as a monomer component used during synthesis of the resin.

As the aforementioned (meth)acrylic resin, a commercially available product may be used. Examples of such a product include Acrypet MF (a name of a product manufactured by Mitsubishi Rayon Co., Ltd., acryl resin), Smipex LG (a name of a product manufactured by Sumitomo Chemical Co., Ltd., acryl resin), Paraloid B series (a name of a product manufactured by Rohm and Haas Electronic Materials LLC, acryl resin), and Parapet G-1000P (a name of a product manufactured by Kuraray Co., Ltd., acryl resin). In the invention, (meth)acrylic acid means both acrylic acid and methacrylic acid, and (meth)acrylate means both acrylate and methacrylate.

As the aforementioned vinyl cyloride-based resin, a commercially available product may be used. Examples of such a product include Kanevinyl S-400 and HM515 (names of products manufactured by Kaneka Corporation) and Solbine C (a name of a product manufactured by Nisshin Chemical Co., Ltd.).

As the resin contained in the non-water-based ink, resin in any of a solid state, a solution state, and an emulsion state, for example, may be used. However, it is preferable to use resin which is dissolved in the ink (resin being dissolved in the ink).

The solid content of the resin is preferably equal to or greater than 0.5% by mass and equal to or less than 10% by mass, more preferably equal to or greater than 0.5% by mass and equal to or less than 6% by mass, and further preferably equal to or greater than 0.5% by mass and equal to or less than 5% by mass with respect to the total mass of the non-water-based ink. If the content of the resin is set to be equal to or greater than 0.5% by mass, the image tends to have further satisfactory abrasion resistance. If the content of the resin is set to be equal to or less than 10% by mass, it is possible to easily set viscosity of the non-water-based ink within a range suitable for ink jet recording.

1.1.4 Other Constituents

The non-water-based ink according to the embodiment can contain a substance, such as a surfactant (for example, silicon-based surfactant, acetylene glycol-based surfactant, or a fluorine-based surfactant), a pH adjuster, chelator such as ethylenediaminetetraacetate (EDTA), an antiseptic agent or a fungicide, or a rust inhibitor, for adding a predetermined performance.

1.1.5 Method of Preparing Non-Water-Based Ink

The non-water-based ink according to the embodiment is obtained by mixing the aforementioned constituents in an arbitrary order and removing impurities as necessary by filtering or the like. As a method of mixing the respective constituents, a method of successively adding the materials in a container provided with a stirrer such as a mechanical stirrer or a magnetic stirrer and stirring and mixing the materials is preferably used. As a filtering method, it is possible to perform centrifugal filtering, filtering with a filter, or the like as necessary.

1.1.6 Physical Properties of Non-Water-Based Ink

Surface tension of the non-water-based ink according to the embodiment at 20° C. is preferably equal to or greater than 20 mN/m and equal to or less than 50 mN/m and more preferably equal to or greater than 25 mN/m and equal to or less than 40 mN/m in terms of balance between recording quality and reliability of the ink for ink jet recording. In addition, the surface tension can be measured by checking surface tension when a platinum plate is moistened with the ink in an environment of 20° C. by using an automatic surface tensionmeter CBVP-Z (manufactured by Kyowa Interface Science Co., Ltd.).

From the same viewpoint, viscosity of the non-water-based ink at 20° C. is preferably equal to or greater than 2 mPa·s and equal to or less than 15 mPa·s and more preferably equal to or greater than 2 mPa·s and equal to or less than 10 mPa·s. The visicosity can be measured by raising a shear rate to a level from 10 to 1000 in an environment at 20° C. and reading viscosity when the shear rate is 200, by using a viscoelasticity tester PhysicaMCR-300 (manufactured by Anton Parr Japan K.K).

1.2 Recording Method 1.2.1 Apparatus Configuration

The ink jet recording method according to the embodiment is performed by using an ink jet recording apparatus. As the ink jet recording apparatus, an apparatus capable of ejecting the aforementioned non-water-based ink in a droplet state from minute nozzles provided in a recording head and causing the droplets to adhere to a recording medium is used. Hereinafter, a detailed description will be given of a structure of the ink jet recording apparatus according to the embodiment with reference to drawings. In order to facilitate understanding of the structure of the ink jet recording apparatus according to the embodiment, dimensions are appropriately changed in some cases.

FIG. 1 is a block diagram showing a configuration of an ink jet recording apparatus 1(100) according to the embodiment. As shown in FIG. 1, the ink jet recording apparatus 1(100) is provided with a transport unit 10, a head unit 20, a preliminary ejection unit 30, a detector group 60, and a controller 70. The ink jet recording apparatus 1(100) receives image data from an input portion 80 for inputting image data and then causes the controller 70 to control the respective units. The controller 70 controls the respective units based on the image data received from the input portion 80 and records an image on a recording medium P. Conditions in the ink jet recording apparatus 1(100) is monitored by the detector group 60, and the detector group 60 outputs a detection result to the controller 70. The controller 70 controls the respective units based on the detection result output from the detector group 60. The image data that the ink jet recording apparatus 1(100) receives from the input portion 80 may be image data which is obtained by performing processing, such as data conversion, on the image data input from another apparatus (not shown) to the input portion 80 by the input portion 80.

More specifically, the controller 70 is a control unit (control section) for controlling the ink jet recording apparatus 1(100) and is provided with an interface unit 72, a CPU 74, a memory 76, and a unit control circuit 78. The interface unit 72 is for exchanging data between the input portion 80 and the ink jet recording apparatus 1(100). The CPU 74 is an operation device for performing overall control of the ink jet recording apparatus 1(100).

The memory 76 is for securing a region for storing a program of the CPU 74 and a work area and is provided with a storage element such as a RAM or an EEPROM. The CPU 74 controls the respective units via the unit control circuit 78 in accordance with the program stored on the memory 76.

The controller 70 may be provided with a time counting portion (a timer or the like) for counting a time interval for preliminary ejection which will be described later. The time counting portion may be embedded in the unit control circuit 78. In addition, the time interval for the preliminary ejection which will be described later can be stored in advance in the memory 76 in accordance with a composition of the non-water-based ink to be used.

The input portion 80 is a portion for inputting image data to be recorded on the recording medium P, and examples thereof include a PC and a touch panel-type input device. The input portion 80 may be provided with a function of converting image data which is input from another device. The input portion 80 may be a PC in which a printer driver for controlling the ink jet recording apparatus 1(100) is installed, for example. On the image data input to the PC, data processing for converting data before the data processing (such as image data in the JPEG format) into data suitable for being recorded on the recording medium P by the ink jet recording apparatus 1(100) (such as image data in the dot format) is performed.

Serial Printer

Figure 2:
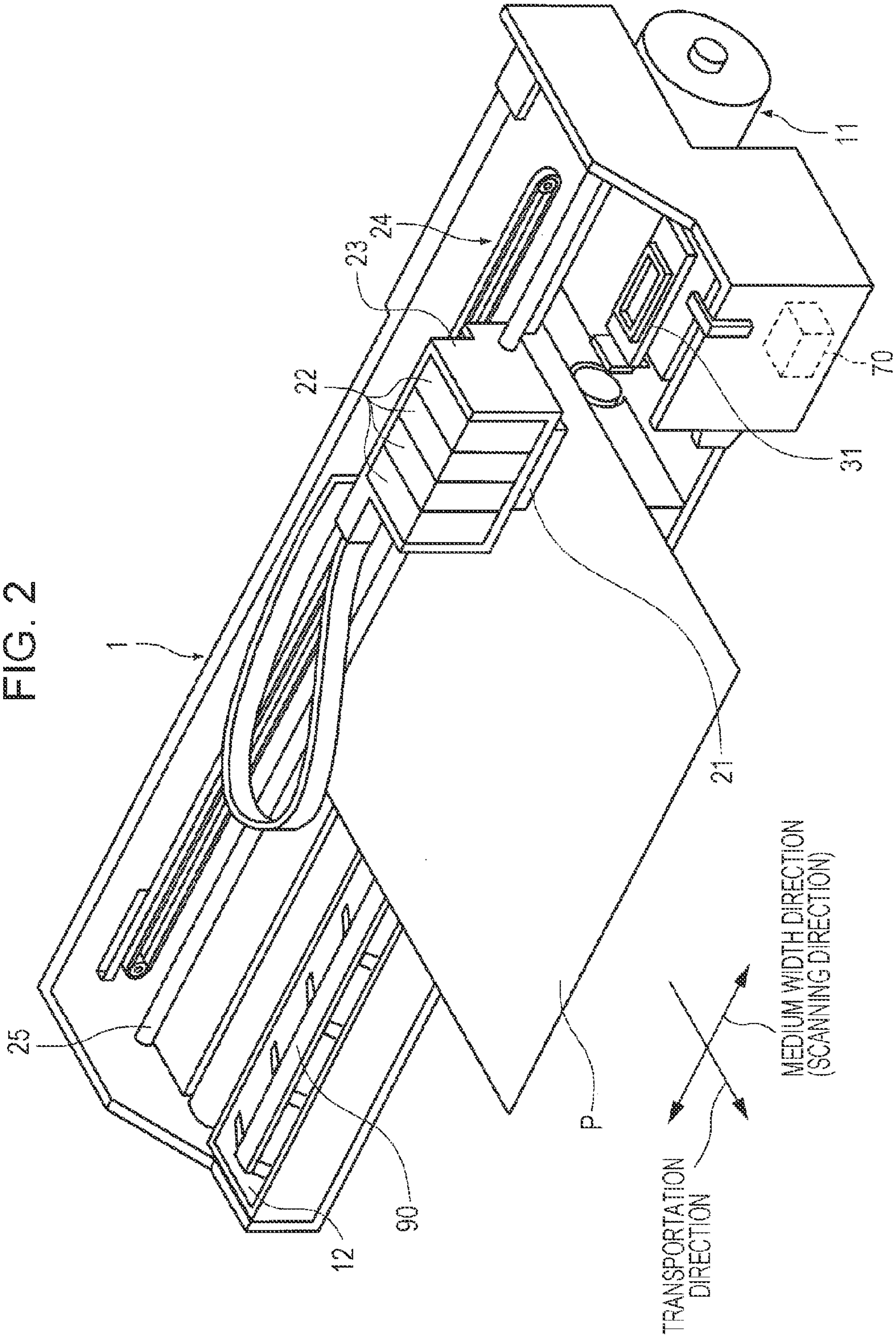
FIG. 2 is a diagram schematically showing a configuration of a serial printer capable of being used for an ink jet recording method according to an embodiment of the invention.

FIG. 2 is a perspective view schematically showing a structure of the ink jet recording apparatus 1 and shows an example where the ink jet recording apparatus is a serial printer. Hereinafter, the ink jet recording apparatus 1 shown in FIG. 2 will be also referred to as a serial printer 1.

The ink jet recording method according to the embodiment can be performed by using the serial printer 1 as shown in FIG. 2, for example. The serial printer is a printer, in which a head is mounted on a carriage travelling a predetermined direction, and which is configured such that ink droplets are ejected on a recording medium by causing the head to travel in accordance with traveling of the carriage.

As shown in FIG. 2, the serial printer 1 is provided with a transport mechanism 11 which transports the recording medium P in a transport direction, a platen 12 which is disposed below a head 21 and supports the transported recording medium P, a carriage 23, on which the head 21 is mounted, and to which an ink cartridge 22 is detachably attached, a carriage traveling mechanism 24 which causes the carriage 23 to travel in a medium width direction of the recording medium P, and a cap member 31 which receives droplets preliminarily ejected from the nozzles provided in the head 21. Furthermore, the serial printer 1 is provided with the aforementioned controller 70 which controls the overall operations of the printer 1. In FIG. 2, the medium width direction corresponds to a scanning direction of the head, and the transport direction corresponds to a direction intersecting the medium width direction.

A transport roller 11 and the platen 12 are examples of components in the transport unit 10 shown in FIG. 1. The transport roller 11 transports the supplied recording medium P in the transport direction in response to a command from the controller 70. In addition, the platen 12 is for supporting the transported recording medium P.

The recording head 21, the ink cartridge 22, the carriage 23, and the carriage traveling mechanism 24 are examples of components in the head unit 20 and eject ink droplets onto the recording medium P and form an image in response to a command from the controller.

The ink cartridge 22 is configured of four independent cartridges. The four respective cartridges are filled with the aforementioned non-water-based ink. In the example shown in FIG. 2, the number of cartridges is four. However, the invention is not limited thereto, and a desired number of cartridges can be mounted. A configuration of the ink cartridge 22 is not limited to the configuration of being mounted on the cartridge 23 as shown in FIG. 1. Alternatively, an ink cartridge with a configuration of being mounted on a side of a case body of the serial printer 1 and supplying ink to the head 21 via a supply tube may also be used, for example.

The carriage 23 is mounted in a state of being supported by a guide rod 25 which is a support member stretched in the medium width direction. The carriage 23 is made to travel in the medium width direction along the guide rod 25 by the carriage traveling mechanism 24 in response to a command from the controller 70. In FIG. 2, the example in which the carriage 23 travels in the medium width direction is shown. However, the invention is not limited thereto, and a mechanism of causing the carriage 23 to travel in the transport direction in addition to causing the carriage 23 to travel in the medium width direction may also be provided.

The recording head 21 includes a plurality of nozzles provided at positions at which the nozzles face the transported recording medium P. The recording head 21 ejects ink droplets from predetermined nozzles in response to a command from the controller 70 while changing the position relative to the recording medium P in accordance with the traveling of the carriage 23.

The cap member 31 is an example of a component in the preliminary ejection unit 30 and is for receiving droplets of the non-water-based ink ejected from the recording head 21 which has been traveled up to the region where the cap member 31 is provided, in response to a command from the controller 70. That is, the preliminary ejection unit 30 is an example of a portion for performing the preliminary ejection process which will be described later, and is used for performing the preliminary ejection not for forming an image on the recording medium. In the example shown in FIG. 2, the cap member 31 is provided at an end of the serial printer 1 in the medium width direction. However, the invention is not limited thereto, and the cap members 31 may be provided at both ends of the serial printer 1 in the medium width direction.

The serial printer 1 may be provided with a heating mechanism 90 for heating the recording medium as shown in FIG. 2. An installation position of the heating mechanism 90 is not particularly limited as long as the heating mechanism 90 is provided at a position at which the heating mechanism 90 can heat the recording medium P. In the example shown in FIG. 2, the heating mechanism 90 is installed above the platen 12 at a position at which the heating mechanism 90 faces the recording head 21. If the heating mechanism 90 is installed at the position at which the heating mechanism 90 faces the recording head 21 as described above, it is possible to reliably heat the droplet adhesion positions on the recording medium P and to thereby efficiently dry the droplets which adhere to the recording medium P.

As the heating mechanism 90, it is possible to use a print heater mechanism which brings the recording medium P into contact with a heat source and heats the recording medium, a mechanism which irradiates the recording medium P with an infrared ray, a microwave (an electromagnetic wave with a maximum wavelength of about 2450 MHz), or the like, a dryer mechanism which blows warm wind, for example.

The recording medium P is heated by the heating mechanism 90 before the droplets ejected from the nozzles adhere to the recording medium P or when the droplets adheres to the recording medium P. With such a configuration, it is possible to quickly dry the droplets which have adhered to the recording medium P. In addition, various conditions for the heating (necessity of the heating, timing of the heating, a heating temperature, a heating time, and the like) are controlled by the controller 70.

Line Printer

Figure 3:
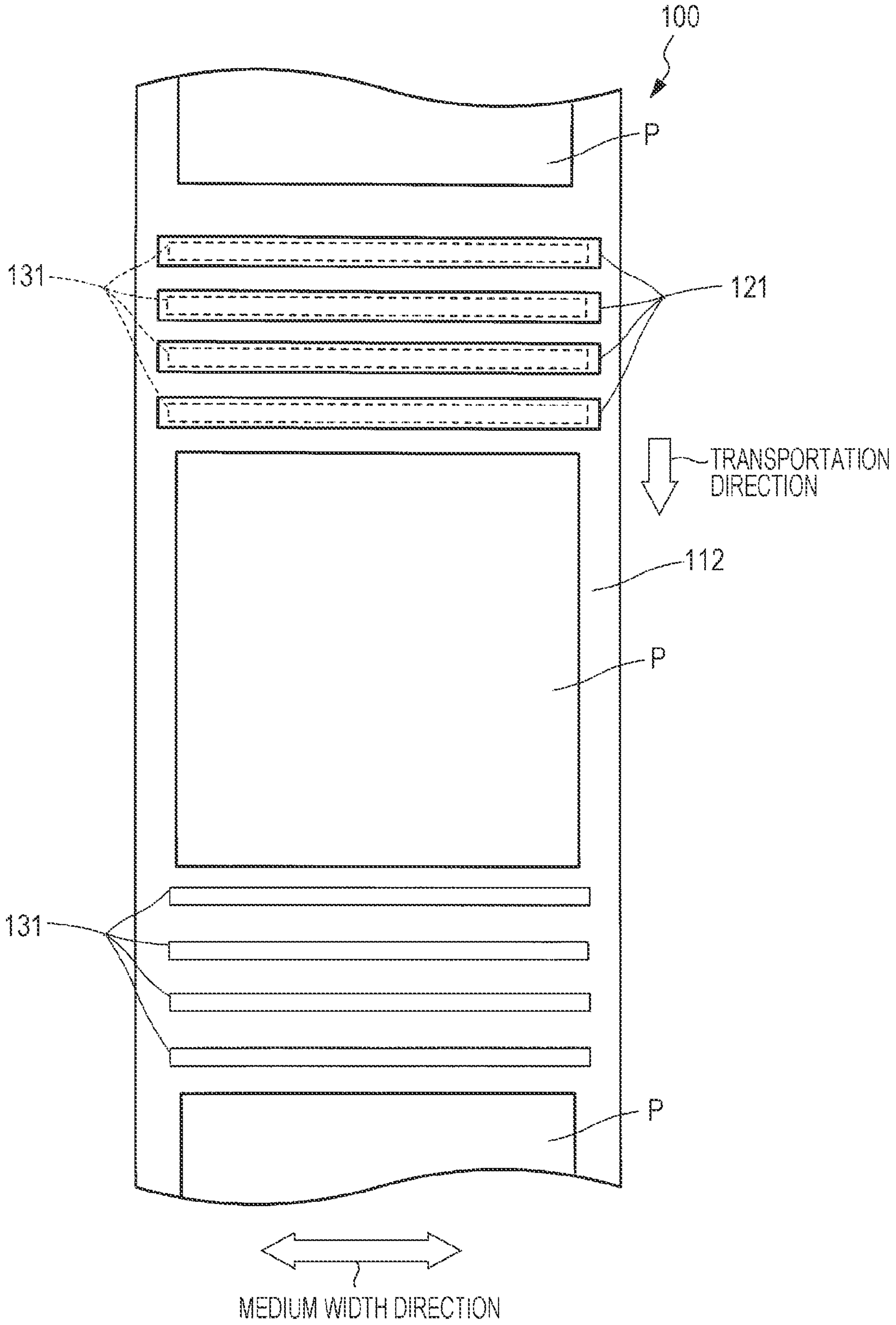
FIG. 3 is a diagram schematically showing a configuration of a line printer capable of being used for an ink jet recording method according to an embodiment of the invention.

FIG. 3 is a diagram schematically showing a part of a structure of the ink jet recording apparatus 100 when viewed from an upper side and shows an example in which the ink jet recording apparatus is a line printer. Hereinafter, the ink jet recording apparatus 100 shown in FIG. 3 will be also referred to as a line printer 100.

The ink jet recording method according to the embodiment can be performed by using the line printer 100 as shown in FIG. 3, for example. The line printer is a printer, in which one of the recording medium and the recording head is fixed during recording of an image, and which is configured to eject ink droplets from a plurality of nozzles provided over the entire region in the medium width direction.

As shown in FIG. 3, the line printer 100 is provided with a platen 112 which transports the recording medium P in the transport direction, recording heads 121 which extend in the medium width direction, and groove portions 131 which are provided on the platen. Although not shown in the drawing, the controller 70 for controlling the overall operations is provided at an arbitrary position in the line printer 100 in the same manner as in the serial printer 1 shown in FIG. 2.

The platen 112 is an example of a component in the transport unit 10 in FIG. 1. A mechanism provided in the transport unit 10 is not limited to the platen 112 as long as the mechanism can transport the recording medium P, and any known mechanism can be used. The platen 112 transports the supplied recording medium P in the transport direction in response to a command from the controller 70. In the example shown in FIG. 1, the recording medium P supported by the platen 112 travels in the transport direction by the platen 112 itself traveling.

The recording heads 121 are an example of a component in the head unit 20 shown in FIG. 1. As shown in FIG. 3, the recording heads 121 are configured of four independent recording heads, and the aforementioned non-water-based ink is supplied to the four respective recording heads. In the example shown in FIG. 3, the number of the recording heads is four. However, the invention is not limited thereto, and a desired number of recording heads can be provided. The recording heads 121 are formed in the width direction of the recording medium. In addition, the recording heads 121 are provided with nozzles, and the plurality of nozzles are provided at positions, at which the nozzles face the recording medium P, in the width direction of the recording medium. The recording heads 121 eject ink droplets from predetermined nozzles in response to a command from the controller 70.

The groove portions 131 are an example of a component in the preliminary ejection unit 30, are formed in the medium width direction, and are provided on the platen 112 at a predetermined interval in the medium transport direction so as to correspond to the recording heads 121. The platen 112 itself travels in response to a command from the controller 70, causes the groove portions 131 to travel to positions corresponding to the recording heads 121 (see FIG. 3), and receives droplets of the non-water-based ink ejected from the recording heads 121. That is, the preliminary ejection unit 30 is an example of a portion for performing the preliminary ejection process which will be described later and is used for performing the preliminary ejection not for forming an image on the recording medium.

In FIG. 3, the example in which the groove portions 131 are provided as the preliminary ejection unit 30 on the platen 122 is shown. However, the invention is not limited thereto. For example, another configuration is also applicable in which cap members corresponding to the recording heads 121 are provided in advance, the cap members or the recording heads 121 are made to travel when the preliminary ejection is performed, and the preliminary ejection is performed from the recording heads 121 toward the cap members. Such a configuration can be used not only for a recording medium as a single piece as shown in FIG. 3 but also for a continuous object (a long recording medium).

In addition, it is possible to perform the preliminary ejection without providing special mechanisms, such as the groove portions 131 and the cap members, as the preliminary ejection unit. For example, nozzles which are not used for forming an image may be made to eject ink droplets during image formation to cause the ink droplets to adhere to the recording medium outside the region where the image is formed.

The line printer 100 may be provided with a heating mechanism (not shown) for heating the recording medium. An installation position of the heating mechanism is not particularly limited as long as the heating mechanism is provided at a position at which the heating mechanism can heat the recording medium P. For example, the heating mechanism can be installed below the platen 112 at a position at which the heating mechanism faces the recording heads 121. If the heating mechanism is installed at the position at which the heating mechanism faces the recording heads 121 as described above, it is possible to reliably heat the droplet adhesion positions on the recording medium P and to thereby efficiently dry the droplets which adhere to the recording medium P. A mechanism which can be used for the heating mechanism, a heating timing, and various conditions of the heating are controlled in the same manner as that of the aforementioned serial printer 1. Therefore, the description thereof will be omitted.

Recording Medium

The recording medium P is not particularly limited. According to the ink jet recording method of the embodiment, a recorded image has a satisfactory drying property even in a case of using a low-ink-absorbent recording medium. Here, the "low-ink-absorbent recording medium" means a recording medium, a water absorption amount of which in 30 $msec^{1/2}$ after the start of contact based on the Bristow method is equal to or less than 10 $mL/m^2$, and a recording medium which has this characteristic at least in a recording surface may be used. According to the definition, the "low-ink-absorbent recording medium" according to the invention also includes a non-ink-absorbent recording medium which does not absorb water at all. The Bristow method is a method which has been most widely distributed as a method of measuring a liquid absorption amount in a short time and has been employed by Japan Technical Association of the Pulp and Paper Industry (Japan TAPPI). Details of the test method are described in Standard No. 51 "Paper and paper board-liquid absorbability Test method-Bristow method" of "Japan TAPPI Paper and Pulp Test Methods 2000".

Specific examples of the low-ink-absorbent recording medium include a sheet, a film, and a textile product which contain low-absorbent materials. In addition, the low-ink-absorbent medium may include a layer containing a low-ink-absorbent material (hereinafter, also referred to as a "low-absorbent layer") on the surface of a base material (such as paper, textile, leather, plastic, glass, ceramic, or metal). Although the low-absorbent material is not particularly limited, examples thereof include olefin-based resin, ester-based resin, urethane-based resin, acryl-based resin, and vinyl chloride-based resin.

Among the examples, a recording medium which has a recording surface containing vinyl chloride-based resin can be preferably used as the low-ink-absorbent recording medium in the case where lactone is contained as the aforementioned organic solvent. Lactone can impregnate the inside of the recording medium with the ink by dissolving the recording surface which contains the vinyl chloride-based resin. With such a configuration, it is possible to further enhance abrasion resistance of an image recorded on the recorded surface which contains the vinyl chloride-based resin. Specific examples of the vinyl chloride-based resin include polyvinyl chloride, vinyl chloride-ethylene copolymer, vinyl chloride-vinyl acetate copolymer, vinyl chloride-vinyl ether copolymer, vinyl chloride-vinylidene chloride copolymer, vinyl chloride-maleic acid ester copolymer, vinyl chloride-(meth)acrylic acid copolymer, vinyl chloride-(meth)acrylic acid ester copolymer, and vinyl chloride-urethane copolymer. In addition, various properties such as a thickness, a shape, a color, a softening temperature, and hardness of the low-ink-absorbent recording medium are not particularly limited.

1.2.2 Ink Jet Recording Method

The ink jet recording method according to the embodiment includes an image formation process and a preliminary ejection process. In the preliminary ejection process, a time interval for the preliminary ejection from a predetermined nozzle is equal to or greater than two seconds and equal to or less than twenty five seconds. The ink jet recording method according to the embodiment can be performed by using the aforementioned ink jet recording apparatus 1(100). Hereinafter, a detailed description will be given of the respective processes in the ink jet recording method according to the embodiment.

Image Formation Process

The image formation process is a process in which droplets of the aforementioned non-water-based ink are ejected from the nozzles of the recording head and the droplets are made to adhere to a recording medium to form (record) an image. With such an operation, it is possible to obtain a recorded object, namely an image formed (recorded) on the recording medium.

In the case of using the aforementioned serial printer 1, an image is formed in every scanning operation (pass) in which the recording head 21 is made to travel with respect to the recording medium P and eject ink, and an image which is desired to finally obtain can be obtained after a plurality of passes. In contrast, in the case of using the aforementioned line printer 100, an image is formed by a single scanning operation (pass) in which the recording heads 121 are made to travel with respect to the recording medium P and eject ink, and an image which is desired to finally obtain can be obtained by the single pass.

As a scheme for causing the nozzles of the recording head to eject the ink, the following schemes can be exemplified. Specific examples of the scheme include a scheme in which an intense electric field is applied between acceleration electrodes which are placed at each nozzle and in front of the nozzle, the nozzles are made to continuously eject ink in a droplet form, and a recording information signal is provided to deflection electrodes while the ink droplets fly between the deflection electrodes to perform recording, or ejection is performed in accordance with the recording information signal without deflecting the ink droplets (electrostatic absorption scheme), a scheme in which the ink droplets are forcedly ejected by applying a pressure to the ink with a small pump and mechanically oscillating the nozzles with a quartz oscillator or the like, a scheme in which the ink droplets are ejected for recording by simultaneously applying a pressure and a recording information signal to the ink with a piezoelectric element (piezoelectric scheme), and a scheme in which the ink droplets are ejected for recording by heating and foaming the ink with a fine electrode in accordance with a recording information signal (thermal jet scheme).

In order to balance both the recording stability and the drying property of the image in a higher level during the image formation process, the surface temperature of the recording medium is preferably equal to or less than 60° C. (more preferably equal to or greater than 0° C. and equal to or less than 60° C.). In terms of a further improvement in the draying speed of the image, the surface temperature of the recording medium is preferably equal to or greater than 40° C., more preferably equal to or greater than 45° C., and further preferably equal to or greater than 50° C. In contrast, in terms of a further improvement in the recording stability, the surface temperature of the recording medium is preferably less than 40°, more preferably equal to or less than 35° C., further more preferably equal to or less than 30° C., and further more preferably equal to or less than 25° C. The surface temperature of the recording medium can be easily set within the predetermined temperature range by using the aforementioned heating mechanism.

Preliminary Ejection Process

The preliminary ejection process is a process in which droplets of the aforementioned non-water-based ink are preliminarily ejected from the nozzles of the recording head not for forming an image, and a time interval for the preliminary ejection from a predetermined nozzle is equal to or greater than 2 seconds and equal to or less than twenty five seconds. With such a configuration, it is possible to suppress nozzle clogging or the like which occurs when the ink dries even if the non-water-based ink that easily dries as described above is used, and to thereby obtain excellent recording stability. As described above, it is possible to balance both the recording stability and the drying property of the image in high levels by the ink jet recording method according to the embodiment. In addition, the preliminary ejection is referred to as flushing in some cases.

It is necessary that the time interval for the preliminary ejection be equal to or greater than two seconds and equal to or less than twenty five seconds. The lower limit thereof is preferably equal to or greater than four seconds, more preferably equal to or greater than five seconds, further more preferably equal to or greater than six seconds, further more preferably equal to or greater than ten seconds, and particularly preferably equal to or greater than fifteen seconds. The upper limit thereof is preferably equal to or less than twenty three seconds and more preferably equal to or less than twenty seconds. By setting the time interval within the above range, it is possible to maintain satisfactory recording stability and to suppress a decrease in the recording speed. In contrast, if the time interval is less than two seconds, the preliminary ejection process is performed often, which causes a decrease in the recording speed. If the time interval exceeds twenty five seconds, the ink which adheres to the vicinity of the nozzles excessively dries, nozzle clogging or the like occurs, and the recording stability deteriorates.

The time interval for the preliminary ejection is counted from a start timing at which ink for the preliminary ejection is ejected from a specific nozzle in the initial preliminary ejection process (first preliminary ejection process) to an end timing at which the ink for the preliminary ejection is ejected from the specific nozzle in the next preliminary ejection process (second preliminary ejection process).

The time interval for the preliminary ejection can be recorded by a user or the like in the memory 76 in advance based on the drying speed or the like in accordance with a composition of the non-water-based ink to be used. In such a case, the controller 70 may read the information stored in the memory 76, may control a relative traveling speed between the recording medium and the recording head, a relative traveling speed between a member configuring the preliminary ejection unit and the recording head, a timing at which the ink is ejected, and the like and may cause the head unit 20 to perform the preliminary ejection at the read time interval.

In the case of using the aforementioned serial printer 1 or the line printer 100, the preliminary ejection is preferably performed before and after the image formation process. In such a case, it is preferable to cause the droplets of the non-water-based ink to adhere to locations other than the recording medium or to eject the droplets and cause the droplets to adhere to a region, which is different from the image formation region in the transport direction, on the recording medium. That is, the preliminary ejection process is performed between the image formation processes.

In the case where the serial printer 1 is used and the aforementioned cap member 31 is provided as the preliminary ejection unit, the cap member 31 can be made to discharge the droplets of the non-water-based ink ejected in the preliminary ejection process. In the case where the serial printer 1 is used, it is preferable to perform the preliminary ejection between scanning operations of the recording head.

In the case where the line printer 100 is used, it is possible to perform the preliminary ejection by causing the aforementioned groove portions 131 provided on the platen 112 to discharge droplets of the non-water-based ink or causing the aforementioned cap members to discharge the droplets of the non-water-based ink before and after the image formation process.

In the case where the preliminary ejection is performed between the image formation processes, the time interval for the preliminary ejection corresponds to elapse time from the first preliminary ejection process performed by a specific nozzle before the image formation process to the second preliminary ejection process performed after the image formation process. Specifically, in the case of forming an image by a plurality of passes, the time interval for the preliminary ejection corresponds to elapse time from the first preliminary ejection process performed before a specific pass to the second preliminary ejection process performed after the specific pass. In addition, the expression “after the specific pass” may represent a timing after a specific pass is completed and before the next pass is performed or may represent a timing after the specific pass is completed and a predetermined number of passes are performed.

In contrast, the preliminary ejection can be performed at the same time with the image formation process, that is, the preliminary ejection can be performed during the image formation process. In the case where the preliminary ejection process is performed at the same time with the image formation process, it is possible to perform the preliminary ejection process by causing a nozzle that is not used for the image formation to eject droplets of the non-water-based ink and causing the droplets to adhere to an image formation region or another region than the image formation region on the recording medium during the image formation process. By performing the preliminary ejection process and the image formation process at the same time as described above, it is possible to realize an increase in image recording speed. In the case where the preliminary ejection is performed at the same time with the image formation process, the time interval for the preliminary ejection is from the first preliminary ejection process performed by a specific nozzle before the ejection for image formation to the second preliminary ejection process performed by the specific nozzle after the ejection for the image formation during the image formation process. The preliminary ejection performed at the same time with the image formation process can be performed in both the case where the serial printer 1 is used and the case where the line printer 100 is used. However, preliminary ejection performed at the same time with the image formation process is preferably employed in the case of using the line printer 100.

Hereinafter, a description will be given of some embodiments of the second invention. The embodiments described below are for illustrating an example of the invention. The invention is not limited to the following embodiments, and various modifications implemented without departing from the gist of the invention are also included. In addition, all the configurations described below are not necessarily essential configurations of the invention.

In the invention, an "image" represents a pattern formed by a group of dots, and examples of the image include a character pattern, a drawing or design pattern, and a solid color pattern.

In the invention, "non-water-based ink" represents ink which contains an organic solvent as a main solvent and does not contain water as a main solvent. The content of water in the ink is preferably equal to or less than 3% by mass, more preferably equal to or less than 1% by mass, further preferably less than 0.05% by mass, further preferably less than 0.01% by mass, further more preferably less than 0.005% by mass, and most preferably less than 0.001% by mass. Alternatively, ink which contains substantially no water may be used. The expression "which contains substantially no water" represents that the water is intentionally not contained in the ink.

1. Ink Jet Recording Method

According to an embodiment of the invention, there is provided an ink jet recording method including: ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image. In the preliminary ejecting of the droplets, a time interval at which the preliminary ejecting is performed by a predetermined nozzle is equal to or greater than two seconds and equal to or less than twenty five seconds. The organic solvent contains glycol ethers with a standard boiling point of equal to or less than 185° C. Content of glycol ethers with the standard boiling point of equal to or less than 185° C. is equal to or greater than 35% by mass with respect to total mass of the non-water-based ink.

Hereinafter, a description will be given of non-water-based ink and a recording method, which are used in the ink jet recording method according to the embodiment, in this order.

1.1 Non-Water-Based Ink

The non-water-based ink which is used in the ink jet recording method according to the embodiment contains an organic solvent, a color material, and resin. Hereinafter, a detailed description will be given of constituents which are or may be contained in the non-water-based ink according to the embodiment.

1.1.1 Organic Solvent

The organic solvent contains glycol ethers with a standard boiling point of equal to or less than 185° C. Since the glycol ethers with the standard boiling point of equal to or less than 185° C. (hereinafter, also referred to as "glycol ethers with a specific boiling point") has an excellent drying property, it is possible to enhance a drying property of a recorded image. In addition, glycol ethers with the specific boiling point has a function of controlling wettability of the ink with respect to the recording medium and a permeation speed, which is a function derived from glycol ethers.

Glycol ethers with the specific boiling point are not particularly limited as long as the standard boiling point is within the aforementioned range. However, examples thereof include alkylene glycol monoethers and alkylene glycol diethers.

Examples of alkylene glycol monoethers with the standard boiling point of equal to or less than 185° C. include ethylene glycol monomethyl ether (125° C.), ethylene glycol monoethyl ether (136° C.), ethylene glycol mono n-butyl ether (170° C.), ethylene glycol mono-tert-butyl ether (153° C.), propylene glycol monomethyl ether (120° C.), propylene glycol monoethyl ether (132° C.), and propylene glycol monobutyl ether (170° C.)

Examples of alkylene glycol diethers with the standard boiling point of equal to or less than 185° C. include ethylene glycol diethyl ether (121° C.), diethylene glycol ethyl methyl ether (176° C.), diethylene glycol dimethyl ether (162° C.), and dipropylene glycol dimethyl ether (171° C.)

Among the examples of glycol ethers with the specific boiling point, it is preferable to use glycol ether with a standard boiling point of equal to or greater than 120° C. and equal to or less than 185° C. and more preferable to use glycol ethers with a standard boiling point of equal to or greater than 130° C. and equal to or less than 185° C. from a viewpoint of suppressing a significant decrease in ejection stability while maintaining a drying property.

It is necessary that a lower limit of the content of glycol ether with the specific boiling point be equal to or greater than 35% by mass, preferably equal to or greater than 50% by mass, and further preferably equal to or greater than 55% by mass with respect to the total mass (100% by mass) of the non-water-based ink. In addition, the upper limit thereof is preferably equal to or less than 90% by mass, more preferably equal to or less than 85% by mass, further more preferably equal to or less than 80% by mass, and particularly preferably equal to or less than 75% by mass. By setting the content of glycol ethers with the specific boiling point to be equal to or greater than 35% by mass, the drying property of the recorded image is enhanced. If the content thereof is equal to or less than 90% by mass, more satisfactory recording stability is achieved. In contrast, if the content of glycol ethers with the specific boiling point is less than 35% by mass, the drying property of the recorded image becomes insufficient, which causes a decrease in recording speed, variations in printed images, and the like in some cases.

As the organic solvent, another solvent than glycol ether with the specific boiling point may be contained. Examples of such a solvent other than glycol ethers with the specific boiling point includes lactone and glycol ethers (except for glycol ethers with the specific boiling point).

Lactone can dissolve a part of a recording surface (preferably a recording surface which contains vinyl chloride-based resin), impregnate the inside of the recording medium with the non-water-based ink, and thereby enhance adhesion of the non-water-based ink with respect to the recording medium. In the invention, "lactone" collectively refers to cyclic compounds, each of which has an ester group (—CO—O—) in the ring. Although lactone is not particularly limited as long as the compound is included in the aforementioned definition, lactone with two to nine carbon atoms is preferably used. Specific examples of such lactone include α-ethyllactone, α-acetolactone, ρ-propiolactone, γ-butyrolactone, δ-valerolactone, ϵ-caprolactone, ζ-enantiolactone, η-caprylolactone, γ-valerolactone, γ-heptalactone, γ-nonalactone, β-methyl-δ-valerolactone, 2-butyl-2-ethylpropiolactone, and α,α-diethylpropiolactone, and among these examples, γ-butyrolactone is particularly preferably used. One of the above examples of lactone may be used alone, or two or more kinds may be mixed and used.

In the case where lactone is contained, the content thereof is preferably equal to or greater than 5% by mass and equal to or less than 20% by mass, and more preferably equal to or greater than 10% by mass and equal to or less than 15% by mass with respect to the total mass of the non-water-based ink. If the content of lactone is equal to or greater than 5% by mass, abrasion resistance of the image tends to be further enhanced. If the content thereof is equal to or less than 20% by mass, glossines of the image tends to be enhanced.

Glycol ethers (except for glycol ethers with the specific boiling point. That is, glycol ethers with a standard boiling point exceeding 185° C.) can control wettability of the non-water-based ink with respect to the recording medium and a permeation speed. Examples of glycol ethers (except for glycol ethers with the specific boiling point) include alkylene glycol monoether and alkylene glycol diether. One kind of glycol ethers may be used alone, or two or more kinds may be mixed and used.

Examples of alkylene glycol monoether include ethylene glycol monoisopropyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, dipropylene glycol monomethyl ether, and dipropylene glycol monoethyl ether.

Examples of alkylene glycol diether include ethylene glycol dimethyl ether, ethylene glycol dibutyl ether, diethylene glycol diethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, and dipropylene glycol diethyl ether.

In the case where glycol ethers (except for glycol ethers with the specific boiling point) are contained, the content thereof is preferably equal to or greater than 5% by mass and equal to or less than 30% by mass, and more preferably equal to or greater than 10% by mass and equal to or less than 25% by mass with respect to the total mass of the non-water-based ink. If the content of glycol ethers is equal to or greater than 5% by mass, glossiness and a dot size of the image tend to become satisfactory. If the content thereof is equal to or less than 30% by mass, it tends to be possible to reduce occurrence of variations in printed images.

1.1.2 Color Material

As a color material, dye may be used, or pigment such as inorganic pigment or organic pigment may be used. However, it is preferable to use pigment in terms of light resistance and the like. One kind of such color materials may be used alone, or two or more kinds may be mixed and used.

Examples of the organic pigment include azo pigment (such as azo-lake, insoluble azo pigment, condensed azo pigment, and chelate azo pigment), polycyclic pigment (such as phthalocyanine pigment, perylene and perylene pigment, anthraquinone pigment, quinacridone pigment, dioxazin pigment, thioindigo pigment, isoindolinone pigment, and guinophthalone pigment), dye-lake (such as basic dye-type lake and acid dye-type lake), nitro pigment, nitroso pigment, aniline black, and daylight fluorescent pigment. In addition, examples of the inorganic pigment include carbon black, titanium dioxide, silica, and alumina.

The content of the color material can be appropriately set as desired and is not particularly limited. However, the content thereof is typically equal to or greater than 0.1% by mass and equal to or less than 10% by mass with respect to the total mass of the non-water-based ink.

In the case where pigment is used as the color material, a pigment dispersant may be contained. Examples thereof include polyester-based polymer compounds such as Hinoact KF1-M, T-6000, T-7000, T-8000, T-8350P, and T-8000E (all of which are manufactured by Takefu Fine Chemicals Co., Ltd.), Solsperse 20000, 24000, 32000, 32500, 33500, 34000, 35200, and 37500 (all of which are manufactured by The Lubrizol Corporation), Disperbyk-161, 162, 163, 164, 166, 180, 190, 191, 192, 2091, and 2095 (all of which are manufactured by BYK Japan KK.), Floren DOPA-17, 22, 33, and G-700 (all of which are manufactured by Kyoeisha Cheimcal Co., Ltd.), Ajisper PB821 and PB711 (all of which are manufactured by Ajinomoto Co., Inc.), and LP4010, LP4050, LP4055, POLYMER 400, 401, 402, 403, 450, 451, and 453 (all of which are manufactured by EFKA Chemicals BV). In the case where the pigment dispersant is used, the content thereof can be appropriately set in accordance with the contained pigment. However, the content of the pigment dispersant is preferably equal to or greater than 5 parts by mass and equal to or less than 200 parts by mass, and more preferably equal to or greater than 30 parts by mass and equal to or less than 120 parts by mass with respect to 100 parts by mass of the pigment contained in the non-water-based ink.

1.1.3 Resin

The non-water-based ink used in the embodiment contains resin. Examples of the resin include resin for forming a coating film to protect an image obtained by the non-water-based ink, resin for enhancing adhesion of an ink coating film of the image, resin for adjusting glossiness of the ink coating film of the image, and resin for enhancing quality of the ink coating film of the image. Among the examples, resin which has at least a function of forming a coating film to protect the image obtained by the non-water-based ink is preferable in terms of friction toughness and the like of a recorded object and is particularly useful in the embodiment of the invention. The resin is referred to as fixation resin in some cases.

Examples of the resin include (meth)acrylic resin (such as poly (meth)acrylic acid, polymethyl (meth)acrylate, polyethyl (meth)acrylate, (meth)acrylic acid-(meth)ester acrylate copolymer resin, styrene-(meth)acryl copolymer resin, ethylene-(meth)acrylic acid copolymer resin, ethylene alkyl (meth)acrylate resin, and ethylene-ester (meth)acrylate copolymer resin), vinyl chloride-based resin (such as polyvinyl chloride and vinyl chloride-vinyl acetate-based copolymer resin), aliphatic polyester, aromatic polyester, polyurethane, epoxy resin, polyvinyl acetate, ethylene-vinyl acetate copolymer resin, polycarbonate, polyvinyl butyral, polyvinyl alcohol, phenoxy resin, ethylcellulose resin, cellulose acetate propionate resin, cellulose acetate butyrate, nitrocellulose resin, polystyrene, vinyl toluene-α-methylstyrene copolymer resin, polyamide, polyimide, polysulfone-based resin, petroleum resin, chlorinated polypropylene, polyolefin, terpene-based resin, rhodine-modified phenol resin, various kinds of synthetic rubber such as NBR, SBR, and MBR, and modified compounds thereof. One kind of such resin may be used alone, or two or more kinds may be mixed and used.

Among the above examples of resin, it is preferable to use at least one of (meth)acrylic resin and vinyl chloride-based resin in terms of a further improvement in abrasion resistance of the image. Particularly, at least (meth)acrylic resin is preferably contained. The (meth)acrylic resin contains at least any one of (meth)acrylate and (meth)acrylic acid as a monomer component used during synthesis of the resin. The vinyl chloride-based resin contains at least vinyl chloride as a monomer component used during synthesis of the resin.

As the aforementioned (meth)acrylic resin, a commercially available product may be used. Examples of such a product include Acrypet MF (a name of a product manufactured by Mitsubishi Rayon Co., Ltd., acryl resin), Smipex LG (a name of a product manufactured by Sumitomo Chemical Co., Ltd., acryl resin), Paraloid B series (a name of a product manufactured by Rohm and Haas Electronic Materials LLC, acryl resin), and Parapet G-1000P (a name of a product manufactured by Kuraray Co., Ltd., acryl resin). In the invention, (meth)acrylic acid means both acrylic acid and methacrylic acid, and (meth)acrylate means both acrylate and methacrylate.

As the aforementioned vinyl cyloride-based resin, a commercially available product may be used. Examples of such a product include Kanevinyl S-400 and HM515 (names of products manufactured by Kaneka Corporation) and Solbine C (a name of a product manufactured by Nisshin Chemical Co., Ltd.).

As the resin contained in the non-water-based ink, resin in any of a solid state, a solution state, and an emulsion state, for example, may be used. However, it is preferable to use resin which is dissolved in the ink (resin being dissolved in the ink).

The solid content of the resin is preferably equal to or greater than 0.5% by mass and equal to or less than 10% by mass, more preferably equal to or greater than 0.5% by mass and equal to or less than 6% by mass, and further preferably equal to or greater than 0.5% by mass and equal to or less than 5% by mass with respect to the total mass of the non-water-based ink. If the content of the resin is set to be equal to or greater than 0.5% by mass, the image tends to have further satisfactory abrasion resistance. If the content of the resin is set to be equal to or less than 10% by mass, it is possible to easily set viscosity of the non-water-based ink within a range suitable for ink jet recording.

1.1.4 Other Constituents

The non-water-based ink according to the embodiment can contain a substance, such as a surfactant (for example, silicon-based surfactant, acetylene glycol-based surfactant, or a fluorine-based surfactant), a pH adjuster, chelator such as ethylenediaminetetraacetate (EDTA), an antiseptic agent or a fungicide, or a rust inhibitor, for adding a predetermined performance.

1.1.5 Method of Preparing Non-Water-Based Ink

The non-water-based ink according to the embodiment is obtained by mixing the aforementioned constituents in an arbitrary order and removing impurities as necessary by filtering or the like. As a method of mixing the respective constituents, a method of successively adding the materials in a container provided with a stirrer such as a mechanical stirrer or a magnetic stirrer and stirring and mixing the materials is preferably used. As a filtering method, it is possible to perform centrifugal filtering, filtering with a filter, or the like as necessary.

1.1.6 Physical Properties of Non-Water-Based Ink

Surface tension of the non-water-based ink according to the embodiment at 20° C. is preferably equal to or greater than 20 mN/m and equal to or less than 50 mN/m and more preferably equal to or greater than 25 mN/m and equal to or less than 40 mN/m in terms of balance between recording quality and reliability of the ink for ink jet recording. In addition, the surface tension can be measured by checking surface tension when a platinum plate is moistened with the ink in an environment of 20° C. by using an automatic surface tensionmeter CBVP-Z (manufactured by Kyowa Interface Science Co., Ltd.)

From the same viewpoint, viscosity of the non-water-based ink at 20° C. is preferably equal to or greater than 2 mPa·s and equal to or less than 15 mPa·s and more preferably equal to or greater than 2 mPa·s and equal to or less than 10 mPa·s. The visicosity can be measured by raising a shear rate to a level from 10 to 1000 in an environment at 20° C. and reading viscosity when the shear rate is 200, by using a viscoelasticity tester Physica MCR-300 (manufactured by Anton Parr Japan K.K).

1.2 Recording Method 1.2.1 Apparatus Configuration

The ink jet recording method according to the embodiment is performed by using an ink jet recording apparatus. As the ink jet recording apparatus, an apparatus capable of ejecting the aforementioned non-water-based ink in a droplet state from minute nozzles provided in a recording head and causing the droplets to adhere to a recording medium is used. Hereinafter, a detailed description will be given of a structure of the ink jet recording apparatus according to the embodiment with reference to drawings. In order to facilitate understanding of the structure of the ink jet recording apparatus according to the embodiment, dimensions are appropriately changed in some cases.

FIG. 1 is a block diagram showing a configuration of an ink jet recording apparatus 1(100) according to the embodiment. As shown in FIG. 1, the ink jet recording apparatus 1(100) is provided with a transport unit 10, a head unit 20, a preliminary ejection unit 30, a detector group 60, and a controller 70. The ink jet recording apparatus 1(100) receives image data from an input portion 80 for inputting image data and then causes the controller 70 to control the respective units. The controller 70 controls the respective units based on the image data received from the input portion 80 and records an image on a recording medium P. Conditions in the ink jet recording apparatus 1(100) are monitored by the detector group 60, and the detector group 60 outputs a detection result to the controller 70. The controller 70 controls the respective units based on the detection result output from the detector group 60. The image data that the ink jet recording apparatus 1(100) receives from the input portion 80 may be image data which is obtained by performing processing, such as data conversion, on the image data input from another apparatus (not shown) to the input portion 80 by the input portion 80.

More specifically, the controller 70 is a control unit (control section) for controlling the ink jet recording apparatus 1(100) and is provided with an interface unit 72, a CPU 74, a memory 76, and a unit control circuit 78. The interface unit 72 is for exchanging data between the input portion 80 and the ink jet recording apparatus 1(100). The CPU 74 is an operation device for performing overall control of the ink jet recording apparatus 1(100). The memory 76 is for securing a region for storing a program of the CPU 74 and a work area and is provided with a storage element such as a RAM or an EEPROM. The CPU 74 controls the respective units via the unit control circuit 78 in accordance with the program stored on the memory 76.

The controller 70 may be provided with a time counting portion (a timer or the like) for counting a time interval for preliminary ejection which will be described later. The time counting portion may be embedded in the unit control circuit 78, for example. In addition, the time interval for the preliminary ejection which will be described later can be stored in advance on the memory 76 in accordance with a composition of the non-water-based ink to be used.

The input portion 80 is a portion for inputting image data to be recorded on the recording medium P, and examples thereof include a PC and a touch panel-type input device. The input portion 80 may be provided with a function of converting image data which is input from another device. The input portion 80 may be a PC in which a printer driver for controlling the ink jet recording apparatus 1(100) is installed, for example. On the image data input to the PC, data processing for converting data before the data processing (such as image data in the JPEG format) into data suitable for being recorded on the recording medium P by the ink jet recording apparatus 1(100) (such as image data in the dot format) is performed.

Serial Printer

FIG. 2 is a perspective view schematically showing a structure of the ink jet recording apparatus 1 and shows an example where the ink jet recording apparatus is a serial printer. Hereinafter, the ink jet recording apparatus 1 shown in FIG. 2 will be also referred to as a serial printer 1.

The ink jet recording method according to the embodiment can be performed by using the serial printer 1 as shown in FIG. 2, for example. The serial printer is a printer, in which a head is mounted on a carriage travelling in a predetermined direction, and which is configured such that ink droplets are ejected to a recording medium by causing the head to travel in accordance with traveling of the carriage.

As shown in FIG. 2, the serial printer 1 is provided with a transport mechanism 11 which transports the recording medium P in a transport direction, a platen 12 which is disposed below a head 21 and supports the transported recording medium P, a carriage 23, on which the head 21 is mounted, and to which an ink cartridge 22 is detachably attached, a carriage traveling mechanism 24 which causes the carriage 23 to travel in a medium width direction of the recording medium P, and a cap member 31 which receives droplets preliminarily ejected from the nozzles provided in the head 21. Furthermore, the serial printer 1 is provided with the aforementioned controller 70 which controls the overall operations of the printer 1. In FIG. 2, the medium width direction corresponds to a scanning direction of the head, and the transport direction corresponds to a direction intersecting the medium width direction.

A transport roller 11 and the platen 12 are examples of components in the transport unit 10 shown in FIG. 1. The transport roller 11 transports the supplied recording medium P in the transport direction in response to a command from the controller 70. In addition, the platen 12 is for supporting the transported recording medium P.

The recording head 21, the ink cartridge 22, the carriage 23, and the carriage traveling mechanism 24 are examples of components in the head unit 20 and eject ink droplets onto the recording medium P and form an image in response to a command from the controller.

The ink cartridge 22 is configured of four independent cartridges. The four respective cartridges are filled with the aforementioned non-water-based ink. In the example shown in FIG. 2, the number of cartridges is four. However, the invention is not limited thereto, and a desired number of cartridges can be mounted. A configuration of the ink cartridge 22 is not limited to the configuration of being mounted on the cartridge 23 as shown in FIG. 1. Alternatively, an ink cartridge with a configuration of being mounted on a side of a case body of the serial printer 1 and supplying ink to the head 21 via a supply tube may also be used, for example.

The carriage 23 is mounted in a state of being supported by a guide rod 25 which is a support member stretched in the medium width direction. The carriage 23 is made to travel in the medium width direction along the guide rod 25 by the carriage traveling mechanism 24 in response to a command from the controller 70. In FIG. 2, the example in which the carriage 23 travels in the medium width direction is shown. However, the invention is not limited thereto, and a mechanism of causing the carriage 23 to travel in the transport direction instead of causing the carriage 23 to travel in the medium width direction may also be provided.

The recording head 21 includes a plurality of nozzles provided at positions at which the nozzles face the transported recording medium P. The recording head 21 ejects ink droplets from predetermined nozzles in response to a command from the controller 70 while changing the position relative to the recording medium P in accordance with the traveling of the carriage 23.

The cap member 31 is an example of a component in the preliminary ejection unit 30 and is for receiving droplets of the non-water-based ink ejected from the recording head 21 which has been traveled up to the region where the cap member 31 is provided, in response to a command from the controller 70. That is, the preliminary ejection unit 30 is an example of a portion for performing the preliminary ejection process which will be described later, and is used for performing the preliminary ejection not for forming an image on the recording medium. In the example shown in FIG. 2, the cap member 31 is provided at an end of the serial printer 1 in the medium width direction. However, the invention is not limited thereto, and the cap members 31 may be provided at both ends of the serial printer 1 in the medium width direction.

The serial printer 1 may be provided with a heating mechanism 90 for heating the recording medium as shown in FIG. 2. An installation position of the heating mechanism 90 is not particularly limited as long as the heating mechanism 90 is provided at a position at which the heating mechanism 90 can heat the recording medium P. In the example shown in FIG. 2, the heating mechanism 90 is installed above the platen 12 at a position at which the heating mechanism 90 faces the recording head 21. If the heating mechanism 90 is installed at the position at which the heating mechanism 90 faces the recording head 21 as described above, it is possible to reliably heat the droplet adhesion positions on the recording medium P and to thereby efficiently dry the droplets which adhere to the recording medium P.

As the heating mechanism 90, it is possible to use a print heater mechanism which brings the recording medium P into contact with a heat source and heats the recording medium, a mechanism which irradiates the recording medium P with an infrared ray, a microwave (an electromagnetic wave with a maximum wavelength of about 2450 MHz), or the like, a dryer mechanism which blows warm wind, for example.

The recording medium P is heated by the heating mechanism 90 before the droplets ejected from the nozzles adhere to the recording medium P or when the droplets adheres to the recording medium P. With such a configuration, it is possible to quickly dry the droplets which have adhered to the recording medium P. In addition, various conditions for the heating (necessity of the heating, timing of the heating, a heating temperature, a heating time, and the like) are controlled by the controller 70.

Line Printer

FIG. 3 is a diagram schematically showing a part of a structure of the ink jet recording apparatus 100 when viewed from an upper side and shows an example in which the ink jet recording apparatus is a line printer. Hereinafter, the ink jet recording apparatus 100 shown in FIG. 3 will be also referred to as a line printer 100.

The ink jet recording method according to the embodiment can be performed by using the line printer 100 as shown in FIG. 3, for example. The line printer is a printer, in which one of the recording medium and the recoding head is fixed during recording of an image, and which is configured to eject ink droplets from a plurality of nozzles provided over the entire medium width direction.

As shown in FIG. 3, the line printer 100 is provided with a platen 112 which transports the recording medium P in the transport direction, recording heads 121 which extend in the medium width direction, and groove portions 131 which are provided on the platen. Although not shown in the drawing, the controller 70 for controlling the overall operations is provided at an arbitrary position in the line printer 100 in the same manner as in the serial printer 1 shown in FIG. 2.

The platen 112 is an example of a component in the transport unit 10 in FIG. 1. A mechanism provided in the transport unit 10 is not limited to the platen 112 as long as the mechanism can transport the recording medium P, and any known mechanism can be used. The platen 112 transports the supplied recording medium P in the transport direction in response to a command from the controller 70. In the example shown in FIG. 1, the recording medium P supported by the platen 112 travels in the transport direction by the platen 112 itself traveling.

The recording heads 121 are an example of a component in the head unit 20 shown in FIG. 1. As shown in FIG. 3, the recording heads 121 are configured of four independent recording heads, and the aforementioned non-water-based ink is supplied to the four respective recording heads. In the example shown in FIG. 3, the number of the recording heads is four. However, the invention is not limited thereto, and a desired number of recording heads can be provided. The recording heads 121 are formed in the width direction of the recording medium. In addition, the recording heads 121 are provided with nozzles, and the plurality of nozzles are provided at positions, at which the nozzles face the recording medium P, over the width direction of the recording medium. The recording heads 121 eject ink droplets from predetermined nozzles in response to a command from the controller 70.

The groove portions 131 are an example of a component in the preliminary ejection unit 30, are formed over the medium width direction, and are provided on the platen 112 at a predetermined interval in the medium transport direction so as to correspond to the recording heads 121. The platen 112 itself travels in response to a command from the controller 70, causes the groove portions 131 to travel to positions corresponding to the recording heads 121 (see FIG. 3), and receives droplets of the non-water-based ink ejected from the recording heads 121. That is, the preliminary ejection unit 30 is an example of a portion for performing the preliminary ejection process which will be described later and is used for performing the preliminary ejection not for forming an image on the recording medium.

In FIG. 3, the example in which the groove portions 131 are provided as the preliminary ejection unit 30 on the platen 122 is shown. However, the invention is not limited thereto. For example, another configuration is also applicable in which cap members corresponding to the recording heads 121 are provided in advance, the cap members or the recording heads 121 are made to travel when the preliminary ejection is performed, and the preliminary ejection is performed from the recording heads 121 toward the cap members. Such a configuration can be used not only for a recording medium as a single piece as shown in FIG. 3 but also for a continuous object (a long recording medium).

In addition, it is possible to perform the preliminary ejection without providing special mechanisms, such as the groove portions 131 and the cap members, as the preliminary ejection unit. For example, nozzles which are not used for forming an image are made to eject ink droplets during image formation to cause the ink droplets to adhere to the recording medium outside the region where the image is formed.

The line printer 100 may be provided with a heating mechanism (not shown) for heating the recording medium. An installation position of the heating mechanism is not particularly limited as long as the heating mechanism is provided at a position at which the heating mechanism can heat the recording medium P. For example, the heating mechanism can be installed below the platen 112 at a position at which the heating mechanism faces the recording heads 121. If the heating mechanism is installed at the position at which the heating mechanism faces the recording heads 121 as described above, it is possible to reliably heat the droplet adhesion positions on the recording medium P and to thereby efficiently dry the droplets which adhere to the recording medium P. A mechanism which can be used for the heating mechanism, a heating timing, and various conditions of the heating are controlled in the same manner as that of the aforementioned serial printer 1. Therefore, the description thereof will be omitted.

Recording Medium

The recording medium P is not particularly limited. According to the ink jet recording method according to the embodiment, a recorded image has a satisfactory drying property even in a case of using a low-ink-absorbent recording medium. Here, the "low-ink-absorbent recording medium" means a recording medium, a water absorption amount of which in 30 $msec^{1/2}$ after the start of contact based on the Bristow method is equal to or less than 10 $mL/m^2$, and a recording medium which has this characteristic at least in a recording surface may be used. According to the definition, the "low-ink-absorbent recording medium" according to the invention also includes a non-ink-absorbent recording medium which does not absorb water at all. The Bristow method is a method which has been most widely distributed as a method of measuring a liquid absorption amount in a short time and has been employed by Japan Technical Association of the Pulp and Paper Industry (Japan TAPPI). Details of the test method are described in Standard No. 51 "Paper and paper board-liquid absorbability Test method-Bristow method" of "Japan TAPPI Paper and Pulp Test Methods 2000".

Specific examples of the low-ink-absorbent recording medium include a sheet, a film, and a textile product which contain low-absorbent materials. In addition, the low-ink-absorbent medium may include a layer containing a low-ink-absorbent material (hereinafter, also referred to as a "low-absorbent layer") on the surface of a base material (such as paper, textile, leather, plastic, glass, ceramic, or metal). Although the low-absorbent material is not particularly limited, examples thereof include olefin-based resin, ester-based resin, urethane-based resin, acryl-based resin, and vinyl chloride-based resin.

Among the examples, a recording medium which has a recording surface containing vinyl chloride-based resin can be preferably used as the low-ink-absorbent recording medium in the case where lactone is contained as the aforementioned organic solvent. Lactone can impregnate the inside of the recording medium with the ink by dissolving the recording surface which contains the vinyl chloride-based resin. With such a configuration, it is possible to further enhance abrasion resistance of an image recorded on the recorded surface which contains the vinyl chloride-based resin. Specific examples of the vinyl chloride-based resin include polyvinyl chloride, vinyl chloride-ethylene copolymer, vinyl chloride-vinyl acetate copolymer, vinyl chloride-vinyl ether copolymer, vinyl chloride-vinylidene chloride copolymer, vinyl chloride-maleic acid ester copolymer, vinyl chloride-(meth)acrylic acid copolymer, vinyl chloride-(meth)acrylic acid ester copolymer, and vinyl chloride-urethane copolymer. In addition, various properties such as a thickness, a shape, a color, a softening temperature, and hardness of the low-ink-absorbent recording medium are not particularly limited.

1.2.2 Ink Jet Recording Method

The ink jet recording method according to the embodiment includes an image formation process and a preliminary ejection process. In the preliminary ejection process, a time interval for the preliminary ejection from a predetermined nozzle is equal to or greater than two seconds and equal to or less than twenty five seconds. The ink jet recording method according to the embodiment can be performed by using the aforementioned ink jet recording apparatus 1(100). Hereinafter, a detailed description will be given of the respective processes in the ink jet recording method according to the embodiment.

Image Formation Process

The image formation process is a process in which droplets of the aforementioned non-water-based ink are ejected from the nozzles of the recording head and the droplets are made to adhere to a recording medium to form (record) an image. With such an operation, it is possible to obtain a recorded object, namely an image formed (recorded) on the recording medium.

In the case of using the aforementioned serial printer 1, an image is formed in every scanning operation (pass) in which the recording head 21 is made to travel with respect to the recording medium P and eject ink, and an image which it is desired to finally obtain can be obtained after a plurality of passes. In contrast, in the case of using the aforementioned line printer 100, an image is formed by a single scanning operation (pass) in which the recording heads 121 are made to travel with respect to the recording medium P and eject ink, and an image which it is desired to finally obtain can be obtained by the single pass.

As a scheme for causing the nozzles of the recording head to eject the ink, the following schemes can be exemplified. Specific examples of the scheme include a scheme in which an intense electric field is applied between acceleration electrodes which are placed at each nozzle and in front of the nozzle, the nozzles are made to continuously eject ink in a droplet form, and a recording information signal is provided to deflection electrodes while the ink droplets fly between the deflection electrodes to perform recording, or ejection is performed in accordance with the recording information signal without deflecting the ink droplets (electrostatic absorption scheme), a scheme in which the ink droplets are forcedly ejected by applying a pressure to the ink with a small pump and mechanically oscillating the nozzles with a quartz oscillator or the like, a scheme in which the ink droplets are ejected for recording by simultaneously applying a pressure and a recording information signal to the ink with a piezoelectric element (piezoelectric scheme), and a scheme in which the ink droplets are ejected for recording by heating and foaming the ink with a fine electrode in accordance with a recording information signal (thermal jet scheme).

The ink jet recording method according to the embodiment preferably includes a heating process for heating the recording medium during the image formation process. With such a process, it is possible to further enhance the drying speed of the image. In the heating process, the lower limit of a surface temperature of the recording medium (that is, a temperature at an image formation location on the recording medium) is preferably equal to or greater than 35° C. and more preferably equal to or greater than 40° C. In addition, the upper limit thereof is preferably equal to or less than 80° C., more preferably equal to or less than 70° C., further more preferably equal to or less than 60° C., and particularly preferably equal to or less than 50° C. If the surface temperature is equal to or greater than 35° C., it is possible to further enhance the drying speed of the image. If the surface temperature is equal to or less than 80° C., it is possible to suppress a decrease in recording stability. The surface temperature of the recording medium can be easily set within the predetermined temperature range by using the aforementioned heating mechanism. In addition, the heating process may be performed at any of a timing before the ink ejection, a timing during the ink ejection, and a timing after ink ejection.

Preliminary Ejection Process

The preliminary ejection process is a process in which droplets of the aforementioned non-water-based ink are preliminarily ejected from the nozzles of the recording head not for forming an image, and a time interval for the preliminary ejection from a predetermined nozzle is equal to or greater than 2 seconds and equal to or less than twenty five seconds. With such a configuration, it is possible to suppress nozzle clogging or the like which occurs when the ink dries even if the non-water-based ink that easily dries as described above is used, and to thereby obtain excellent recording stability. As described above, it is possible to balance both the recording stability and the drying property of the image in high levels by the ink jet recording method according to the embodiment. In addition, the preliminary ejection is referred to as flushing in some cases.

It is necessary that the time interval for the preliminary ejection be equal to or greater than two seconds and equal to or less than twenty five seconds. The lower limit thereof is preferably equal to or greater than four seconds, more preferably equal to or greater than five seconds, further more preferably equal to or greater than six seconds, further more preferably equal to or greater than ten seconds, and particularly preferably equal to or greater than fifteen seconds. The upper limit thereof is preferably equal to or less than twenty three seconds and more preferably equal to or less than twenty seconds. By setting the time interval in the above range, it is possible to maintain satisfactory recording stability and to suppress a decrease in the recording speed. In contrast, if the time interval is less than two seconds, the preliminary ejection process is performed often, which causes a decrease in the recording speed. If the time interval exceeds twenty five seconds, the ink which adheres to the vicinity of the nozzles excessively dries, nozzle clogging or the like occurs, and the recording stability deteriorates.

The time interval for the preliminary ejection is counted from a start timing at which ink for the preliminary ejection is ejected from a specific nozzle in the initial preliminary ejection process (first preliminary ejection process) to an end timing at which the ink for the preliminary ejection is ejected from the specific nozzle in the next preliminary ejection process (second preliminary ejection process). In addition, the image formation process may be performed between the first preliminary ejection process and the second preliminary ejection process regardless of whether or not the ink is ejected from the specific nozzle in the image formation process. In the preliminary ejection, the ink droplets are continuously ejected a plurality of times from the predetermined nozzle in every preliminary ejection process in some cases. However, the time interval for the preliminary ejection is a time interval between the first preliminary ejection process to a timing at which the ink is ejected from the specific nozzle until the second preliminary ejection process, instead of an ejection cycle of the continuous ejection.

The time interval for the preliminary ejection can be recorded by a user or the like in the memory 76 in advance based on the drying speed or the like in accordance with a composition of the non-water-based ink to be used. In such a case, the controller 70 may read the information stored in the memory 76, may control a relative traveling speed between the recording medium and the recording head, a relative traveling speed between a member configuring the preliminary ejection unit and the recording head, a timing at which the ink is ejected, and the like and may cause the head unit 20 to perform the preliminary ejection at the read time interval.

In the case of using the aforementioned serial printer 1 or the line printer 100, the preliminary ejection is preferably performed before and after the image formation process. In such a case, it is preferable to cause the droplets of the non-water-based ink to adhere to locations other than the recording medium or to eject the droplets and cause the droplets to adhere to a region, which is different from the image formation region in the transport direction, on the recording medium. That is, the preliminary ejection process is performed between the image formation processes.

In the case where the serial printer 1 is used and the aforementioned cap member 31 is provided as the preliminary ejection unit, the cap member 31 can be made to discharge the droplets of the non-water-based ink ejected in the preliminary ejection process. In the case where the serial printer 1 is used, it is preferable to perform the preliminary ejection between scanning operations of the recording head.

In the case where the line printer 100 is used, it is possible to perform the preliminary ejection by causing the aforementioned groove portions 131 provided on the platen 112 to discharge droplets of the non-water-based ink or causing the aforementioned cap members to discharge the droplets of the non-water-based ink before and after the image formation process.

In the case where the preliminary ejection is performed between the image formation processes, the time interval for the preliminary ejection corresponds to elapse time from the first preliminary ejection process performed by a specific nozzle before the image formation process to the second preliminary ejection process performed after the image formation process. Specifically, in the case of forming an image by a plurality of passes, the time interval for the preliminary ejection corresponds to elapse time from the first preliminary ejection process performed before a specific pass to the second preliminary ejection process performed after the specific pass. In addition, the expression "after the specific pass" may represent a timing after a specific pass is completed and before the next pass is performed or may represent a timing after the specific pass is completed and a predetermined number of passes are performed.

In contrast, the preliminary ejection can be performed at the same time with the image formation process, that is, the preliminary ejection can be performed during the image formation process. In the case where the preliminary ejection process is performed at the same time with the image formation process, it is possible to perform the preliminary ejection process by causing a nozzle that is not used for the image formation to eject droplets of the non-water-based ink and causing the droplets to adhere to an image formation region or another region than the image formation region on the recording medium during the image formation process. By performing the preliminary ejection process and the image formation process at the same time as described above, it is possible to realize an increase in image recording speed. In the case where the preliminary ejection is performed at the same time with the image formation process, the time interval for the preliminary ejection is from the first preliminary ejection process performed by a specific nozzle before the ejection for image formation to the second preliminary ejection process performed by the specific nozzle after the ejection for the image formation during the image formation process. The preliminary ejection performed at the same time with the image formation process can be performed in both the case where the serial printer 1 is used and the case where the line printer 100 is used. However, preliminary ejection performed at the same time with the image formation process is preferably employed in the case of using the line printer 100.

2. Examples

Hereinafter, a specific description will be given of the first invention based on examples and comparative examples. However, the invention is not limited to these examples.

2.1 Preparation of Non-Water-Based Ink

Only organic solvents corresponding to the concentrations described in Table 1 were stirred in containers for the respective types of ink, and mixture solvents were obtained. Predetermined amounts of Solsperse 37500 (a name of a product manufactured by The Lubrizol Corporation) and pigment were added to a part of each obtained mixture solvent and were preliminary dispersed by using a homogenizer. The obtained mixture was subjected to dispersion processing using a bead mill filled with zirconia beads with a diameter of 0.3 mm, and pigment dispersions containing pigment with an average grain size of 130 nm were obtained. Then, resin was added to a remaining part of each mixture solvent, and resin solutions were obtained by stirring and dissolving the mixtures. Non-water-based ink in each of examples and comparative examples was obtained by adding the remaining part of the mixture solvent, a surfactant, and the above resin solution into each pigment dispersion, stirring the mixture for one hour, and filtering the mixture by using a membrane filter with a size of 5 μm manufactured from PTFE.

The used constituents shown in the table are as follows.

PB-15:3 (C.I. pigment blue 15:3, copper phthalocyanine pigment)

Solsperse 37500 (a name of a product manufactured by The Lubrizol Corporation, resin dispersant)

GBL (γ-butyrolactone, standard boiling point: 204° C.)

DEGBME (diethylene glycol butyl methyl ether, standard boiling point: 212° C.)

TetraEGmBE (tetraethylene glycol monobutyl ether, standard boiling point: 300° C.)

PGmME-AC (propylene glycol monomethyl ether acetate, standard boiling point: 146° C.)

ethyl lactate (standard boiling point: 155° C.)

methyl caprylate (standard boiling point: 188° C. to 193° C.)

3-methoxy-3-methyl-1-butanol (standard boiling point: 174° C.)

Naphtesol 160 (a name of a product manufactured by JX Nippon Oil & Energy Corporation, alicyclic hydrocarbon-based solvent, distillation range: 157° C. to 179° C.)

BYK 340 (a name of a product manufactured by BYK Japan KK., fluorine-based surfactant)

HM 515 (a name of a product "Kanevinyl HM515" manufactured by Kaneka Corporation, vinyl chloride-vinyl acetate copolymer)

G-1000P (a name of a product "Parapet G-1000P", methacryl resin optical microscope. A printed surface with no variations in printing was evaluated as six points, and evaluation into six grades from six points to one point was conducted.

2.2.2 Glossiness

Solid color printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, recorded objects were produced by drying the printed objects at 25° C. at 65% RH (relative humidity) for one day. Thereafter, 20° glossiness of the solid color printed portion was measured by MULTI GLOSS 268 (manufactured by Konica Minolta, Inc.), and glossiness was evaluated with scores by dividing glossiness levels into every two levels, that is, a glossiness level of less than 26 was evaluated as one point, and a glossiness level of equal to or greater than 26

TABLE 1

| | | | Example | | | | | | Comparative Example | | | |
|---|---|---|---|---|---|---|---|---|---|---|---|---|
| | | | 1 | 2 | 3 | 4 | 5 | 6 | 1 | 2 | 3 | 4 |
| Color material (pigment) | | PB-15:3 | 4 | 4 | 4 | 4 | 4 | 4 | 4 | 4 | 4 | 4 |
| Pigment dispersant | | Solsperse 37500 | 4 | 4 | 4 | 4 | 4 | 4 | 4 | 4 | 4 | 4 |
| Organic solvent | First solvent | PGmME-AC | 40 | 55 | 30 | | 30 | 15 | 20 | | 42 | 25 |
| | | ethyl lactate | | | 21 | 41 | | | | | | |
| | | methyl caprylate | 10 | 5 | | | 4 | 25 | 4 | | 10 | 5 |
| | | 3-methox-3-methyl-1-butanol | 21 | 14 | | 16 | 10 | 5 | 7 | | 21 | 5 |
| | | Naphtesol 160 | | | 15 | 10 | | | | | | |
| | Other solvent | GBL | 5 | | 20 | 15 | 15 | 15 | 15 | 20 | 7 | |
| | | DEGBME | 10 | 12 | | | 22 | 22 | 35 | 45 | 10 | 51 |
| | | TetraEGmBE | | | | | 5 | 4 | 5 | 21 | | |
| Surfactant | | BYK 340 | 2 | 2 | 2 | 2 | 2 | 2 | 2 | 2 | 2 | 2 |
| Resin | | HM 515 | 2 | 2 | 2 | 4 | 2 | 2 | 2 | 2 | | 2 |
| | | G-1000P | 2 | 2 | 2 | 4 | 2 | 2 | 2 | 2 | | 2 |
| Total mass of non-water-based ink (% by mass) | | | 100 | 100 | 100 | 100 | 100 | 100 | 100 | 100 | 100 | 100 |
| Content of first solvent with respect to 100% by mass corresponding to total mass of non-water-based ink (% by mass) | | | 71 | 74 | 66 | 67 | 44 | 45 | 31 | 0 | 73 | 35 |
| Rate of solvent with standard boiling point of equal to or less than 185° C. when total mass of first solvent is assumed to be 100% by mass (% by mass) | | | 85.9 | 93.2 | 100.0 | 100.0 | 90.9 | 44.4 | 87.1 | — | 86.3 | 85.7 |

2.2 Evaluation Tests

The respective evaluation tests were conducted by using an ink jet printer "SC-S30650" (product name) manufactured by Seiko Epson Corporation which was installed in an test room in an environment adjusted such that the temperature thereof was 25° C. and the moisture thereof was 65% RH by using an air conditioner and a humidifier. In addition, the temperature and the moisture were measured by a temperature and humidity sensor which was installed on a case body that was not affected by heat generation by a heater in the ink jet printer itself. Moreover, a time interval for the preliminary ejection was set to three seconds when the samples for the evaluation tests were produced, except for evaluation of ejection stability. When the ink was ejected and was made to adhere, the surface temperature of the recording medium was set to 25° C., and the heating mechanism was not used.

2.2.1 Variations in Printing

Solid color printing with recording resolution of 720 dpi×720 dpi with a concentration of 100% was performed on a vinyl chloride banner sheet (manufactured by 3M Japan Limited, Model No. IJ51 (polyvinyl chloride)) with the respective non-water-based ink samples by using the above printer. Then, the printed objects were dried at 25° C. at 65% RH (relative humidity) for sixty minutes. Thereafter, the printed surfaces were observed visually and by using an and less than 28 was evaluated as two points, for example. Excellent glossiness has an advantage in that it is possible to obtain a feeling of glossiness, which is similar to that of the recording medium itself with glossiness such as a film, in particular, from the recorded object on the recording medium.

2.2.3 Dot Size

Solid color printing with recording resolution of 720 dpi×720 dpi with a concentration of 30% was performed on a vinyl chloride banner sheet (manufactured by 3M Japan Limited, Model No. IJ51 (polyvinyl chloride)) with the respective non-water-based ink samples by using the above printer, and squares with a side length of 3 cm were printed. Then, the printed objects were dried at 25° C. at 65% RH (relative humidity) for sixty minutes. Thereafter, dot sizes in the printed portions were observed by using an optical microscope, and the diameters of the dots were classified into every 10 μm. In a case where significant ink bleeding occurred, the dot shape was not a circular shape, and it was not possible to measure the dot size. As a scale of ink bleeding decreased, the dot shape approached an exact circle. However, the dot size (diameter) also decreased. The dot sizes were evaluated with scores by dividing the dot sizes into every 10 μm, that is, a dot size of equal to or less than 20 μm was evaluated as one point, and a dot size of greater than 20 μm and equal to or less than 30 μm was evaluated as two points, for example. A satisfactory dot size means that a wet spreading property of the ink on the recording medium is satisfactory, and there is an advantage in that it is possible to cover the recording medium with the ink and thereby to achieve a satisfactory color generating property of the recorded object.

2.2.4 Friction Toughness (Abrasion Resistance)

Solid color printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, recorded objects were produced by drying the printed objects at 25° C. at 65% RH (relative humidity) for one day. Next, a dry-type test was conducted by using an I-type tester based on JIS L 0849. Thereafter, ODs of test cotton clothes were measured by a Spectrolino (manufactured by Gretag-Macbeth GmbH), and color transfer was evaluated for every 0.05 with scores, that is, an OD of equal to or greater than 0.4 was evaluated as one point, and an OD of equal to or greater than 0.35 and less than 0.4 was evaluated as two points, for example.

2.2.5 Surface Drying Property

Printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, the printed objects were dried at 25° C. at 65% RH (relative humidity) for five minutes. Next, the printed objects were wound by using a winding device, and scratching on the printed surface after being wound was observed. In the observation, a rate of the area where the scratching occurred was calculated by measuring surface roughness by a laser microscope (manufactured by Keyence Corporation, model No. VK-8700 Generation 2). The surface drying property was classified into ranks of every 10%, that is, a drying property of a printed object in which the area of scratching was equal to or less than 10% of the printed region was evaluated as five points, and a drying property of a printed object in which the area of scratching was greater than 10% and equal to or less than 20% was evaluated as 4 points, for example. A drying property of a printed object in which no scratching occurred was evaluated as six points.

2.2.6 Printing Stability (Recording Stability)

printing with a concentration of 30% was conducted on a glossy polyvinyl chloride sheet (manufactured by Roland DG Corporation, model No. SV-G-1270G) with commercially available black ink for the printer and with the non-water-based ink samples prepared as described above for one hour while a periodical flushing (preliminary ejection) interval was set to five seconds. Then, ejection failures were examined after completion of the test, and a rate of occurrence of ejection failure nozzles was investigated. The total number of nozzles was 360. Then, the periodical flushing (preliminary ejection) interval was shifted to fifteen seconds, twenty five seconds, and thirty five seconds, and rates of occurrence of ejection failure nozzles were similarly examined. Printing stability was classified into ranks of every 5%, that is, printing stability for a rate of ejection failure nozzles of equal to or less than 1% was evaluated as five points, and printing stability for a rate of ejection failure nozzles of greater than 1% and equal to or less than 5% was evaluated as four points, for example. Printing stability for a rate of ejection failure nozzles of zero was evaluated as six points. During the test, an image for which the non-water-based ink as an evaluation target was not used at all was recorded. Specifically, a black image was recorded by using only black ink, which is the commercially available ink for this printer, and with which another nozzle array than a nozzle array filled with the non-water-based ink as the evaluation target is filled. Then, preliminary ejection was performed from all the nozzles to a flushing box (cap member) at an interval of one main scanning operation or two or more main scanning operations between main scanning operations.

2.3 Evaluation Results

Results of the above evaluation tests will be shown in Table 2.

TABLE 2

| | | Example | | | | | | Comparative Example | | | |
|---|---|---|---|---|---|---|---|---|---|---|---|
| Evaluation test | | 1 | 2 | 3 | 4 | 5 | 6 | 1 | 2 | 3 | 4 |
| Variations in printing | | 5 | 6 | 6 | 5 | 5 | 4 | 2 | 2 | 5 | 2 |
| Glossiness | | 5 | 6 | 5 | 5 | 6 | 6 | 6 | 6 | 6 | 6 |
| Dot size | | 6 | 5 | 5 | 5 | 6 | 6 | 6 | 6 | 6 | 5 |
| Friction toughness | | 5 | 5 | 5 | 6 | 5 | 5 | 5 | 5 | 1 | 5 |
| Surface drying property | | 5 | 6 | 6 | 5 | 4 | 4 | 3 | 2 | 5 | 2 |
| Printing stability | Preliminary ejection interval: five seconds | 6 | 6 | 5 | 5 | 6 | 6 | 6 | 6 | 6 | 6 |
| | Preliminary ejection interval: fifteen seconds | 6 | 5 | 5 | 4 | 6 | 6 | 6 | 6 | 6 | 5 |
| | Preliminary ejection interval: twenty five seconds | 5 | 5 | 4 | 4 | 6 | 6 | 6 | 5 | 5 | 5 |
| | Preliminary ejection interval: thirty five seconds | 2 | 2 | 2 | 1 | 3 | 3 | 3 | 4 | 4 | 3 |

As shown in the evaluation results in Table 2, it was possible to record images with excellent recording stability, excellent drying properties, and excellent abrasion resistance by performing flushing at specific intervals by using the non-water-based ink which contained specific amounts of first solvent in the examples.

In contrast, since recording was performed by using non-water-based ink in which the content of the first solvent was less than 40% by mass in Comparative Examples 1 and 4, the drying properties of the recorded images were degraded. In addition, since recording was performed by using non-water-based ink which did not contain the first solvent in Comparative Example 2, the drying property of the recorded image was significantly degraded. In addition, since recording was performed by using non-water-based ink which did not contain the resin in Comparative Example 3, the abrasion resistance (friction toughness) was degraded.

Although not shown in the table, a part of the evaluation was conducted in the same manner as in Example 1 and Comparative Example 1 other than that a heater was provided at the platen in the ink jet recording apparatus and image recording was performed while the surface temperature of the recording medium was set to 40° C. In an example corresponding to Example 1, printing stability in the case where the preliminary ejection interval was twenty five seconds was evaluated as four, and printing stability in the case where the preliminary ejection interval was thirty five seconds was evaluated as one. In an example corresponding to Comparative Example 1, variations in printing were evaluated as three. Based on these results, the ink jet recording method according to the invention capable of securing ejection stability by setting the preliminary ejection interval within the predetermined range is particularly useful when recording is performed under a condition in which it is possible to reduce occurrence of variations in printing by raising the surface temperature (equal to or greater than 40° C., for example) of the recording medium during the recording. In contrast, the ink jet recording method according to the invention in which the non-water-based ink capable of satisfactorily reducing occurrence of variations in printing is used is also useful even in a case of performing recording under a condition in which it is possible to enhance ejection stability by lowering the surface temperature (equal to or less than 35° C., for example) of the recording medium during the recording.

Hereinafter, a specific description will be given of the second invention based on examples and comparative examples. However, the invention is not limited to these examples.

2.1 Preparation of Non-Water-Based Ink

Only organic solvents corresponding to the concentrations described in Table 3 were stirred in containers for the respective types of ink, and mixture solvents were obtained. Predetermined amounts of Solsperse 37500 (a name of a product manufactured by The Lubrizol Corporation) and pigment were added to a part of each obtained mixture solvent and were preliminary dispersed by using a homogenizer. The obtained mixture was subjected to dispersion processing using a bead mill filled with zirconia beads with a diameter of 0.3 mm, and pigment dispersions containing pigment with an average grain size of 130 nm were obtained. Then, resin was added to a remaining part of each mixture solvent, and resin solutions were obtained by stirring and dissolving the mixtures. Non-water-based ink in each of examples and comparative examples was obtained by adding the remaining part of the mixture solvent, a surfactant, and the above resin solution into each pigment dispersion, stirring the mixture for one hour, and filtering the mixture by using a membrane filter with a size of 5 μm manufactured from PTFE.

The used constituents shown in the table are as follows.

PB-15:3 (C.I. pigment blue 15:3, copper phthalocyanine pigment)

Solsperse 37500 (a name of a product manufactured by The Lubrizol Corporation, resin dispersant)

GBL (γ-butyrolactone, standard boiling point: 204° C.)

DPGmME (dipropylene gycol monomethyl ether, standard boiling point: 187° C.)

DEGBME (diethylene glycol butyl methyl ether, standard boiling point: 212° C.)

DEGDEE (diethylene glycol diethyl ether, standard boiling point: 189° C.)

DPGDME (dipropylene glycol dimethyl ether, standard boiling point: 171° C.)

DEGDME (diethylene glycol dimethyl ether, standard boiling point: 162° C.)

DEGMEE (diethylene glycol methyl ethyl ether, standard boiling point: 176° C.)

3-methoxybutyl acetate (standard boiling point: 171° C.)

ethyl lactate (standard boiling point: 155° C.)

propylene glycol monomethyl ether acetate (boiling point: 146° C.)

BYK 340 (a name of a product manufactured by BYK Japan KK., fluorine-based surfactant)

HM 515 (a name of a product "Kanevinyl HM515" manufactured by Kaneka Corporation, vinyl chloride-vinyl acetate copolymer)

G-1000P (a name of a product "Parapet G-1000P", methacryl resin)

TABLE 3

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Color material (pigment) | PB-15:3 | 4 | 4 | 4 | 4 | 4 | 4 | 4 | 4 | 4 | 4 | 4 | 4 |
| Pigment dispersant | Solsperse 37500 | 4 | 4 | 4 | 4 | 4 | 4 | 4 | 4 | 4 | 4 | 4 | 4 |
| Organic solvent | GBL (standard boiling point: 204° C.) | 20 | 10 | 20 | 5 | 20 | 15 | 10 | 20 | | 20 | 20 | 20 |
| | DPGmME (standard boiling point: 187° C.) | — | — | — | — | 16 | 13 | — | — | 6 | — | 21 | |
| | DEGBME (standard boiling point: 212° C.) | 22 | 6 | 16 | 6 | — | — | 5 | 22 | 10 | 25 | 20 | |
| | DEGDEE (standard boiling point: 189° C.) | — | — | — | — | — | — | — | — | | — | — | |
| | DPGDME (standard boiling point: 171° C.) | 40 | 70 | | | | | 60 | 40 | 70 | 45 | | 30 |
| | DEGDME (standard boiling point: 162° C.) | | | 50 | 75 | 25 | | | | | | 25 | |
| | DEGMEE (standard boiling point: 176° C.) | | | | | 25 | 60 | | | | | | |
| | 3-methoxybutyl acetate (standard boiling point: 171° C.) | | | | | | | | | | | | 22 |
| | Ethyl lactate (standard boiling point: 155° C.) | | | | | | | | | | | | 5 |
| | propylene glycol monomethyl ether acetate (standard boiling point: 146° C.) | | | | | | | | | | | | 5 |
| Surfactant | BYK 340 | 2 | 2 | 2 | 2 | 2 | 2 | 2 | 2 | 2 | 2 | 2 | 2 |
| Resin | HM 515 | 8 | 4 | 4 | 2 | 2 | 1 | 15 | — | 4 | — | 2 | 8 |
| | G-1000P | — | — | — | 2 | 2 | 1 | — | 8 | | — | 2 | |
| Total mass of non-water-based ink (% by mass) | | 100 | 100 | 100 | 100 | 100 | 100 | 100 | 100 | 100 | 100 | 100 | 100 |
| Content of glycol ethers with specific boiling point with respect to total mass of non-water-based ink (% by mass) | | 40 | 70 | 50 | 75 | 50 | 60 | 60 | 40 | 70 | 45 | 25 | 30 |

2.2 Evaluation Tests

The respective evaluation tests were conducted by using an ink jet printer "SC-S30650" (product name) manufactured by Seiko Epson Corporation which was installed in an test room in an environment adjusted such that the temperature thereof was 25° C. and the moisture thereof was 65% RH by using an air conditioner and a humidifier.

In the evaluation, recording was performed under a heater heating condition, in which the surface temperature of the recoding medium on the recording side was 40° C., by using a heater provided at the platen in the printer. After the recording, post-drying of the recorded object after being discharged from the printer was performed at 25° C.

In addition, the temperature and the moisture were measured by a temperature and humidity sensor which was installed on a case body that was not affected by heat generation by a heater or the like in the ink jet printer itself. Moreover, a time interval for the preliminary ejection was set to three seconds when the samples for the evaluation tests were produced, except for evaluation of ejection stability.

2.2.1 Variations in Printing

Solid color printing with recording resolution of 720 dpi×720 dpi with a concentration of 100% was performed on a vinyl chloride banner sheet (manufactured by 3M Japan Limited, Model No. IJ51 (polyvinyl chloride)) with the respective non-water-based ink samples by using the above printer. Then, the printed objects were dried at 25° C. at 65% RH (relative humidity) for sixty minutes. Thereafter, the printed surfaces were observed visually and by using an optical microscope. A printed surface with no variations in printing was evaluated as six points, and evaluation into six grades from six points to one point was conducted.

2.2.2 Glossiness

Solid color printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, recorded objects were produced by drying the printed objects at 25° C. at 65% RH (relative humidity) for one day. Thereafter, 20° glossiness of the solid color printed portion was measured by MULTI GLOSS 268 (manufactured by Konica Minolta, Inc.), and glossiness was evaluated with scores by dividing glossiness levels into every two levels, that is, a glossiness level of less than 26 was evaluated as one point, and a glossiness level of equal to or greater than 26 and less than 28 was evaluated as two points, for example. Excellent glossiness has an advantage in that it is possible to obtain a feeling of glossiness, which is similar to that of the recording medium itself with glossiness such as a film, in particular, from the recorded object on the recording medium.

2.2.3 Dot Size

Solid color printing with recording resolution of 720 dpi×720 dpi with a concentration of 30% was performed on a vinyl chloride banner sheet (manufactured by 3M Japan Limited, Model No. IJ51 (polyvinyl chloride)) with the respective non-water-based ink samples by using the above printer, and squares with a side length of 3 cm were printed. Then, the printed objects were dried at 25° C. at 65% RH (relative humidity) for sixty minutes. Thereafter, dot sizes in the printed portions were observed by using an optical microscope, and the diameters of the dots were classified into every 10 μm. In a case where significant ink bleeding occurred, the dot shape was not a circular shape, and it was not possible to measure the dot size. As a scale of ink bleeding decreased, the dot shape approached an exact circle. However, the dot size (diameter) also decreased. The dot sizes were evaluated with scores by dividing the dot sizes into every 10 μm, that is, a dot size of equal to or less than 20 μm was evaluated as one point, and a dot size of greater than 20 μm and equal to or less than 30 μm was evaluated as two points, for example. A satisfactory dot size means that a wet spreading property of the ink on the recording medium is satisfactory, and there is an advantage in that it is possible to cover the recording medium with the ink and thereby to achieve a satisfactory color generating property of the recorded object.

2.2.4 Friction Toughness (Abrasion Resistance)

Solid color printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, recorded objects were produced by drying the printed objects at 25° C. at 65% RH (relative humidity) for one day. Next, a dry-type test was conducted by using an I-type tester based on JIS L 0849. Thereafter, ODs of test cotton clothes were measured by a Spectrolino (manufactured by Gretag-Macbeth GmbH), and color transfer was evaluated for every 0.05 with scores, that is, an OD of equal to or greater than 0.4 was evaluated as one point, and an OD of equal to or greater than 0.35 and less than 0.4 was evaluated as two points, for example.

2.2.5 Surface Drying Property

Printing with recording resolution of 720 dpi×720 dpi with a concentration of 100% was performed on a glossy polyvinyl chloride sheet (manufactured by Roland DG Corporation, model No. SV-G-1270G) with the respective non-water-based ink samples by using the above printer. Then, the printed objects were dried at 40° C. on the platen for five minutes. Next, the printed objects were wound by using a winding device, and scratching on the printed surface after being wound was observed. In the observation, a rate of the area where the scratching occurred was calculated by measuring surface roughness by a laser microscope (manufactured by Keyence Corporation, model No. VK-8700 Generation 2). The surface drying property was classified into ranks of every 10%, that is, a drying property of a printed object in which the area of scratching was equal to or less than 10% of the printed region was evaluated as five points, and a drying property of a printed object in which the area of scratching was greater than 10% and equal to or less than 20% was evaluated as 4 points, for example. A drying property of a printed object in which no scratching occurred was evaluated as six points.

2.2.6 Printing Stability (Recording Stability)

printing with a concentration of 30% was conducted on a glossy polyvinyl chloride sheet (manufactured by Roland DG Corporation, model No. SV-G-1270G) with commercially available black ink for the printer and with the non-water-based ink samples prepared as described above for one hour while a periodical flushing (preliminary ejection) interval was set to five seconds. Then, ejection failures were examined after completion of the printing, and a rate of occurrence of ejection failure nozzles was investigated. The total number of nozzles was 360. Then, the periodical flushing (preliminary ejection) interval was shifted to fifteen seconds, twenty five seconds, and thirty five seconds, and rates of occurrence of ejection failure nozzles were similarly examined. Printing stability was classified into ranks of every 5%, that is, printing stability for a rate of ejection failure nozzles of equal to or less than 1% was evaluated as five points, and printing stability for a rate of ejection failure nozzles of greater than 1% and equal to or less than 5% was evaluated as four points, for example. Printing stability for a rate of ejection failure nozzles of zero was evaluated as six points. During the test, an image for which the non-water-based ink as an evaluation target was not used at all was recorded. Specifically, a black image was recorded by using only black ink, which is the commercially available ink for this printer, and with which another nozzle array than a nozzle array filled with the non-water-based ink as the evaluation target is filled. Then, preliminary ejection was performed from all the nozzles to a flushing box (cap member) at an interval of one main scanning operation or two or more main scanning operations between main scanning operations.

2.3 Evaluation Results

Results of the above evaluation tests will be shown in Table 4.

TABLE 4

| Evaluation test | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|
| Variations in printing | | 5 | 6 | 6 | 6 | 5 | 6 | 5 | 6 | 5 | 5 | 3 | 6 |
| Glossiness | | 6 | 5 | 6 | 5 | 6 | 6 | 5 | 6 | 6 | 6 | 6 | 2 |
| Dot size | | 6 | 5 | 5 | 5 | 6 | 5 | 6 | 6 | 6 | 6 | 6 | 2 |
| Friction toughness | | 5 | 5 | 5 | 6 | 6 | 4 | 6 | 2 | 3 | 1 | 6 | 5 |
| Surface drying property | | 5 | 6 | 5 | 6 | 5 | 6 | 4 | 5 | 6 | 6 | 2 | 6 |
| Printing stability | Preliminary ejection interval: five seconds | 6 | 6 | 6 | 6 | 6 | 6 | 5 | 6 | 6 | 6 | 6 | 4 |
| | Preliminary ejection interval: fifteen seconds | 6 | 6 | 6 | 6 | 6 | 6 | 4 | 6 | 6 | 6 | 6 | 3 |
| | Preliminary ejection interval: twenty five seconds | 5 | 5 | 6 | 5 | 6 | 6 | 4 | 5 | 5 | 6 | 6 | 2 |
| | Preliminary ejection interval: thirty five seconds | 2 | 2 | 3 | 2 | 3 | 3 | 1 | 3 | 3 | 5 | 5 | 1 |

As shown in the evaluation results in Table 4, it was possible to record images with excellent recording stability, excellent drying properties, and excellent abrasion resistance by performing flushing at specific intervals by using the non-water-based ink which contained specific amounts of glycol ethers with specific boiling points in the examples.

In contrast, since recording was performed by using non-water-based ink which did not contain resin in Comparative Example 1, the abrasion resistance of the image was degraded. In addition, since recording was performed by using non-water-based ink in which the content of glycol ethers with the specific boiling point was less than 35% in Comparative Example 2, the drying property of the recorded image was degraded. In addition, since another solvent with a boiling point of less than 185° C. than glycol ether was used in Comparative Example 3, the recording stability was degraded.

Although not shown in the table, a part of the evaluation was conducted in the same manner as in Example 1 and Comparative Example 2 other than that image recording was performed while the surface temperature of the recording medium was set to 30° C. In an example corresponding to Example 1, printing stability in the case where the preliminary ejection interval was twenty five seconds was evaluated as six, and printing stability in the case where the preliminary ejection interval was thirty five seconds was evaluated as three. In an example corresponding to Comparative Example 2, the surface drying property was evaluated as one. Based on these results, the ink jet recording method according to the invention is particularly useful since ejection stability can be secured even when the surface temperature is set to 35° C., which is particularly advantageous for enhancing quality of the recorded object, in the heating process.

The invention is not limited to the aforementioned embodiments, and various modifications can be made. For example, substantially the same configurations (configurations which include the same functions and methods or bring the same results or configurations which are for the same objects or bring the same effects) as those described in the embodiments are included in the invention. In addition, configurations in which portions that are not essential parts for the configurations described in the embodiments are replaced are also included in the invention. Moreover, configurations which bring the same advantages as those of the configurations described in the embodiment or configurations which can achieve the same objects are also included in the invention. Furthermore, configurations obtained by adding known techniques to the configurations described in the embodiments are also included in the invention.

The entire disclosure of Japanese Patent Application No. 2014-057931, filed Mar. 20, 2014 and 2014-028250, filed Feb. 18, 2014 are expressly incorporated by reference herein.

The entire disclosure of Japanese Patent Application No. 2014-028250, filed Feb. 18, 2014 and 2014-057931, filed Mar. 20, 2014 are expressly incorporated by reference herein.

What is claimed is:

1. An ink jet recording method comprising:

ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image, wherein in the preliminary ejecting of the droplets, a time interval at which the preliminary ejecting is performed by a predetermined nozzle is equal to or greater than two seconds and equal to or less than twenty five seconds, wherein the organic solvent contains a first solvent which is an ester-based solvent, the ester based solvent is at least one kind selected from methyl acetate, ethyl acetate, n-propyl acetate, isopropyl acetate, n-butyl acetate, isobutyl acetate, isopentyl acetate, secondary butyl acetate, amyl acetate, methoxybutyl acetate, methyl lactate, ethyl lactate, butyl lactate, methyl caprylate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate, wherein content of the first solvent is equal to or greater than 40% by mass with respect to entire content of the non-water-based ink, wherein the first solvent contains a solvent with a boiling point of equal to or greater than 145° C. and equal to or less than 185° C., wherein the content of the solvent with a boiling point of equal to or greater than 145° C. and equal to or less than 185° C. is equal to or greater than 50% by mass and equal to or less than 95% by mass with respect to the total mass of the first solvent, and wherein the non-water-based ink further contains a lactone-based solvent.

2. The ink jet recording method according to claim 1, wherein the resin contains at least one of vinyl chloride-based resin and (meth)acrylic-based resin.

3. The ink jet recording method according to claim 1, wherein content of the resin is equal to or greater than 0.5% by mass and equal to or less than 10% by mass with respect to total mass of the non-water-based ink.

4. The ink jet recording method according to claim 1, wherein the ejecting of the droplets to form an image is performed by a plurality of scanning operations, in each of which the non-water-based ink is ejected while a position of the recording head relative to the recording medium is changed.

5. The ink jet recording method according to claim 4, wherein in the preliminary ejecting of the droplets, the preliminary ejecting is performed between the scanning operations, and the droplets of the non-water-based ink is ejected onto another object than the recording medium.

6. The ink jet recording method according to claim 1, wherein the ejecting of the droplets to form an image is performed by a single scanning operation in which the non-water-based ink is ejected while a position of the recording head relative to the recording medium is changed.

7. The ink jet recording method according to claim 6, wherein in the preliminary ejecting of the droplets, the droplets of the non-water-based ink is made to adhere to a position outside a region, in which the image is to be formed, on the recording medium.

8. The ink jet recording method according to claim 1, wherein the recording medium is a low-ink-absorbent recording medium.

9. The ink jet recording method according to claim 1, wherein in the ejecting of the droplets to form an image, a surface temperature of the recording medium is equal to or less than 60° C.

10. The ink jet recording method according to claim 1, wherein the ester based solvent is at least one kind selected from ethyl lactate and propylene glycol monomethyl ether acetate.

11. An ink jet recording method comprising:

ejecting droplets of non-water-based ink, which contains an organic solvent, a color material, and resin, from nozzles of a recording head and causing the droplets to adhere to a recording medium to form an image; and preliminarily ejecting the droplets of the non-water-based-ink from the nozzles of the recording head not for forming the image, wherein in the preliminary ejecting of the droplets, a time interval at which the preliminary ejecting is performed by a predetermined nozzle is equal to or greater than two seconds and equal to or less than twenty five seconds, wherein the organic solvent contains glycol ethers with a standard boiling point of equal to or greater than 120° C. and equal to or less than 185° C., wherein content of glycol ethers with the standard boiling point of equal to or greater than 120° C. and equal to or less than 185° C. is equal to or greater than 55% by mass and equal to or less than 75% by mass with respect to total mass of the non-water-based ink wherein the organic solvent further contains glycol ethers with a standard boiling point exceeding 185° C., wherein the content of the glycol ethers with a standard boiling point exceeding 185° C. is equal to or greater than 5% by mass and equal to or less than 22% by mass with respect to total mass of the non-water-based ink, and wherein the content of water in the non-water-based ink is equal to or less than 3% by mass.

12. The ink jet recording method according to claim 11, wherein the resin contains at least one of vinyl chloride-based resin and (meth)acrylic-based resin.

13. The ink jet recording method according to claim 11, wherein the resin contains vinyl chloride-based resin.

14. The ink jet recording method according to claim 11, wherein content of the resin is equal to or greater than 0.5% by mass and equal to or less than 10% by mass with respect to total mass of the non-water-based ink.

15. The ink jet recording method according to claim 11 further comprising:

in the ejecting of the droplets to form an image, heating the recording medium.

16. The ink jet recording method according to claim 15, wherein in the heating of the recording medium, a surface temperature of the recording medium is heated to a temperature of equal to or greater than 35° C.

17. The ink jet recording method according to claim 11, wherein the non-water-based ink further contains a lactone-based solvent.

18. The ink jet recording method according to claim 11, wherein the ejecting of the droplets to form an image is performed by a plurality of scanning operations, in each of which the non-water-based ink is ejected while a position of the recording head relative to the recording medium is changed.

19. The ink jet recording method according to claim 18, wherein in the preliminary ejecting of the droplets, the preliminary ejecting is performed between the scanning operations, and the droplets of the non-water-based ink is ejected onto another object than the recording medium.

20. The ink jet recording method according to claim 11, wherein the glycol ethers with the standard boiling point of equal to or greater than 120° C. is at least one kind selected from an alkylene glycol monoethers and alkylene glycol diethers.

21. The ink jet recording method according to claim 11, wherein the color material is a pigment.

22. The ink jet recording method according to claim 11, wherein the content of glycol ethers with the standard boiling point of equal to or greater than 120° C. and equal to or less than 185° C. is equal to or greater than 60% by mass with respect to total mass of the non-water-based ink.

23. The ink jet recording method according to claim 11, wherein the content of glycol ethers with the standard boiling point of equal to or greater than 120° C. and equal to or less than 185 is equal to or greater than 70% by mass with respect to total mass of the non-water-based ink.

24. The ink jet recording method according to claim 11, wherein the content of glycol ethers has a standard boiling point of equal to or less than 176° C.

25. The ink jet recording method according to claim 11, wherein the glycol ethers having a standard boiling point of equal to or greater than 120° C. and equal to or less than 185° C. contain one of dipropylene glycol dimethyl ether and diethylene glycol ethyl methyl ether.

* * * * *